United States Patent [19]
Noser

[11] Patent Number: 5,365,518
[45] Date of Patent: Nov. 15, 1994

[54] SONET OVERHEAD SERVER

[75] Inventor: Francis G. Noser, Raleigh, N.C.

[73] Assignee: Alcatel Network Systems, Inc., Richardson, Tex.

[21] Appl. No.: 844,238

[22] Filed: Mar. 2, 1992

[51] Int. Cl.⁵ .................................. H04Q 11/04
[52] U.S. Cl. ........................ 370/58.1; 370/60.1
[58] Field of Search .................... 370/58.1, 58.2, 58.3, 370/60, 60.1, 94.1, 94.2, 94.3, 110.1, 112, 102, 100.1; 379/291, 335

[56] References Cited

U.S. PATENT DOCUMENTS

| | | | |
|---|---|---|---|
| 4,967,405 | 10/1990 | Upp et al. | 370/58.1 |
| 5,001,708 | 3/1991 | William et al. | 370/110.1 |
| 5,018,132 | 5/1991 | William et al. | 370/110.1 |
| 5,040,170 | 8/1991 | Upp et al. | 370/84 |
| 5,101,404 | 3/1992 | Kunimoto et al. | 370/60 |
| 5,134,614 | 7/1992 | Baydar et al. | 370/110.1 |
| 5,142,529 | 8/1992 | Parruck et al. | 370/84 |
| 5,144,297 | 9/1992 | Ohara | 370/60 |
| 5,214,642 | 5/1993 | Kunimoto et al. | 370/60 |

*Primary Examiner*—Douglas W. Olms
*Assistant Examiner*—Ajit Patel
*Attorney, Agent, or Firm*—Ware, Fressola, Van Der Sluys & Adolphson

[57] ABSTRACT

A server combines a multiplexer/demultiplexer with a circuit switch to handle both high-speed overhead and data interfaced to the server through a cross-connect; multiple servers may be connected to the cross-connect in a star, mesh or ring network.

7 Claims, 21 Drawing Sheets

| | 1 | 2 | 3 | 4 | 5 | 6 | 7 | 8 | 9 | 10 | ••• | 84 | 85 | ••• | 200 | 201 | ••• | 270 |
|---|---|---|---|---|---|---|---|---|---|---|---|---|---|---|---|---|---|---|
| | A1 | A1 | A1 | A2 | A2 | A2 | * | * | * | OH | | OH | * | | * | OH | | OH |
| | * | * | * | * | * | * | * | * | * | OH | | OH | * | | * | OH | | OH |
| | * | * | * | * | * | * | * | * | * | OH | | OH | * | | * | OH | | OH |
| | * | * | * | * | * | * | * | * | * | OH | | OH | * | | * | OH | | OH |
| | * | * | * | * | * | * | * | * | * | OH | OH | OH | * | * | * | OH | OH | OH |
| | * | * | * | * | * | * | * | * | * | OH | | OH | * | | * | OH | | OH |
| | * | * | * | * | * | * | * | * | * | OH | | OH | * | | * | OH | | OH |
| | * | * | * | * | * | * | * | * | * | OH | | OH | * | | * | OH | | OH |
| | * | * | * | * | * | * | * | * | * | OH | | OH | * | | * | OH | | OH |
| | * | * | * | * | * | * | * | * | * | OH | | OH | * | | * | OH | | OH |

FIGURE 4

|←------ SBI-B or SBI-E Frame 64 8-bit Time-slots/125 μs ------→|

| TS0 | TS1 | TS2 | TS3 | TS4 | TS5 | | TS58 | TS59 | TS60 | TS61 | TS62 | TS63 |

SONET OVERHEAD SERVER

REFERENCE TO RELATED APPLICATION

This patent application discloses subject matter that is disclosed and may be claimed in co-owned, co-pending U.S. patent application Ser. No. 07/844,245, filed Mar. 2, 1992, entitled "Inter-Network Element Transport of SONET Overhead".

TECHNICAL FIELD

This invention relates to telecommunications systems and, more particularly, to overhead processing of Synchronous Optical Network (SONET) signals.

BACKGROUND OF THE INVENTION

Over the long term, the SONET overhead, as defined in various standards, including ANSI T1.105, places some major constraints on any switching node in terms of the amount of bandwidth required. Initially, these requirements may be of much less significance, because of lesser usage of the full capacity of the SONET signal. Thus, the initial approach for architectures will probably not need to account for high usage, since the near term low usage with non-SONET interfaces would not justify it. For the long term, with more SONET interface usage, each switching node will have to contain appropriate equipment to efficiently address a fuller overhead functional usage.

DISCLOSURE OF INVENTION

It is an object of the present invention to provide equipment to handle such functions as overhead processing for SONET signals.

According to the present invention, a server is provided in a wideband digital cross-connect (such as a SONET cross-connect) for receiving a wideband signal (such as a SONET signal) and organizing the content thereof for distant transmission or for local subscriber use by way of a matrix in the digital cross-connect. The matrix may also be used for cross-connecting the so-organized SONET signal for overhead transmission and reception to/from other server functions, i.e., internal to the digital cross-connect.

The wideband digital cross-connect switch disclosed in the above-mentioned co-pending application provides value-added functionality to a SONET network. An element that has been identified to implement some of the required functionality thereof, consistent with the requirements of providing flexibility, provision for future functional growth, modularity and fault tolerance is a server, according to the disclosure hereof. A server may be a self-contained element within the wideband digital cross-connect switch, other times called a SONET cross-connect, that contains its own necessary intelligence and interfaces for proper operation of assigned functions. Such servers are to be designed such that functionality can be partitioned in various ways such as logical, equipment geographical, efficient and standardized interfaces.

BRIEF DESCRIPTION OF THE DRAWINGS

FIG. 3 shows the relation between FIGS. 3(a) and 3(b).

FIG. 4 shows the format and content of the STM-1** signal.

FIG. 5 shows the format of SBI frames.

BEST MODE FOR CARRYING OUT THE INVENTION

Figure 1:
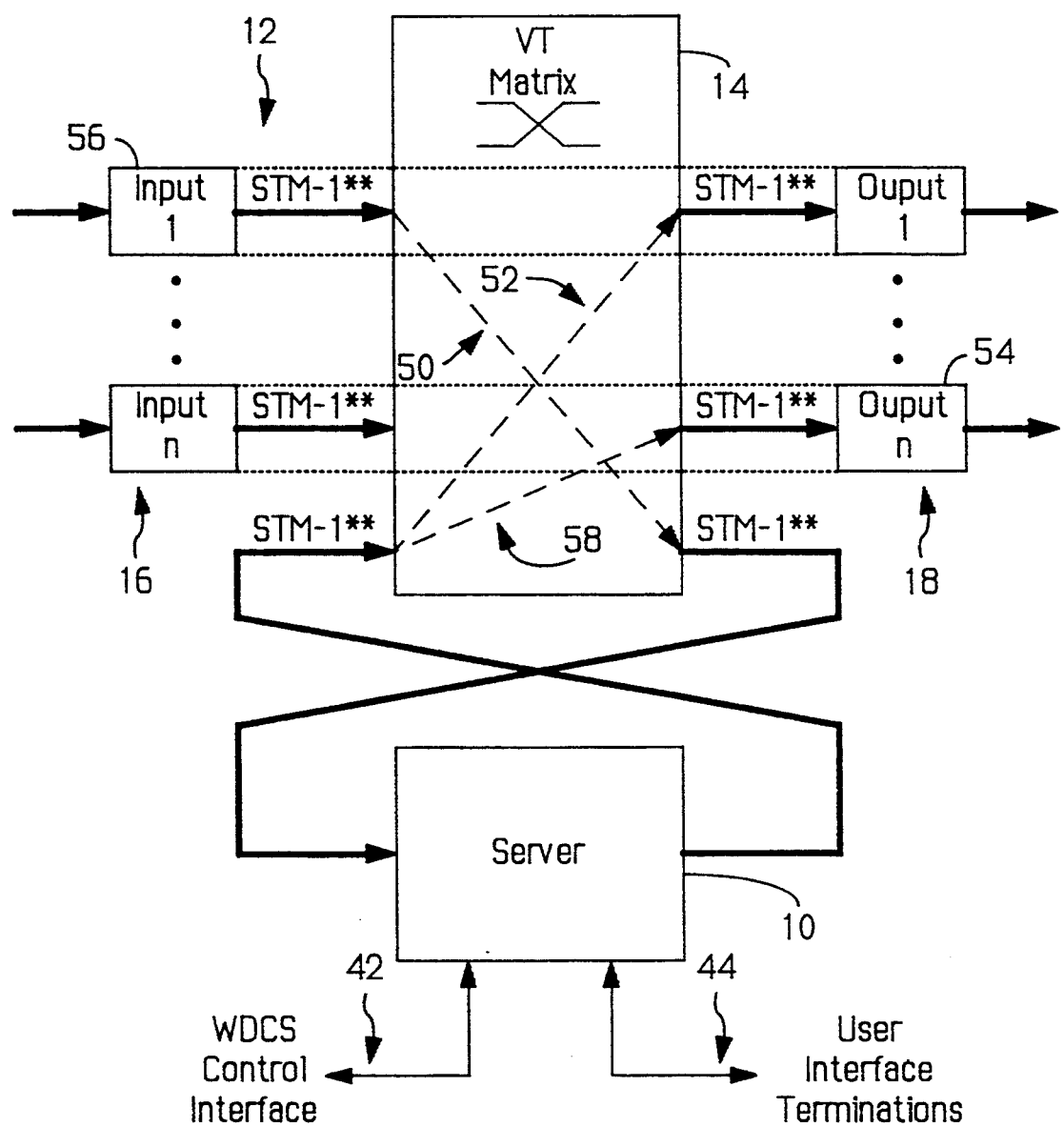
FIG. 1 shows a wideband digital cross-connect having a server, according to the present invention.
Figure 2:
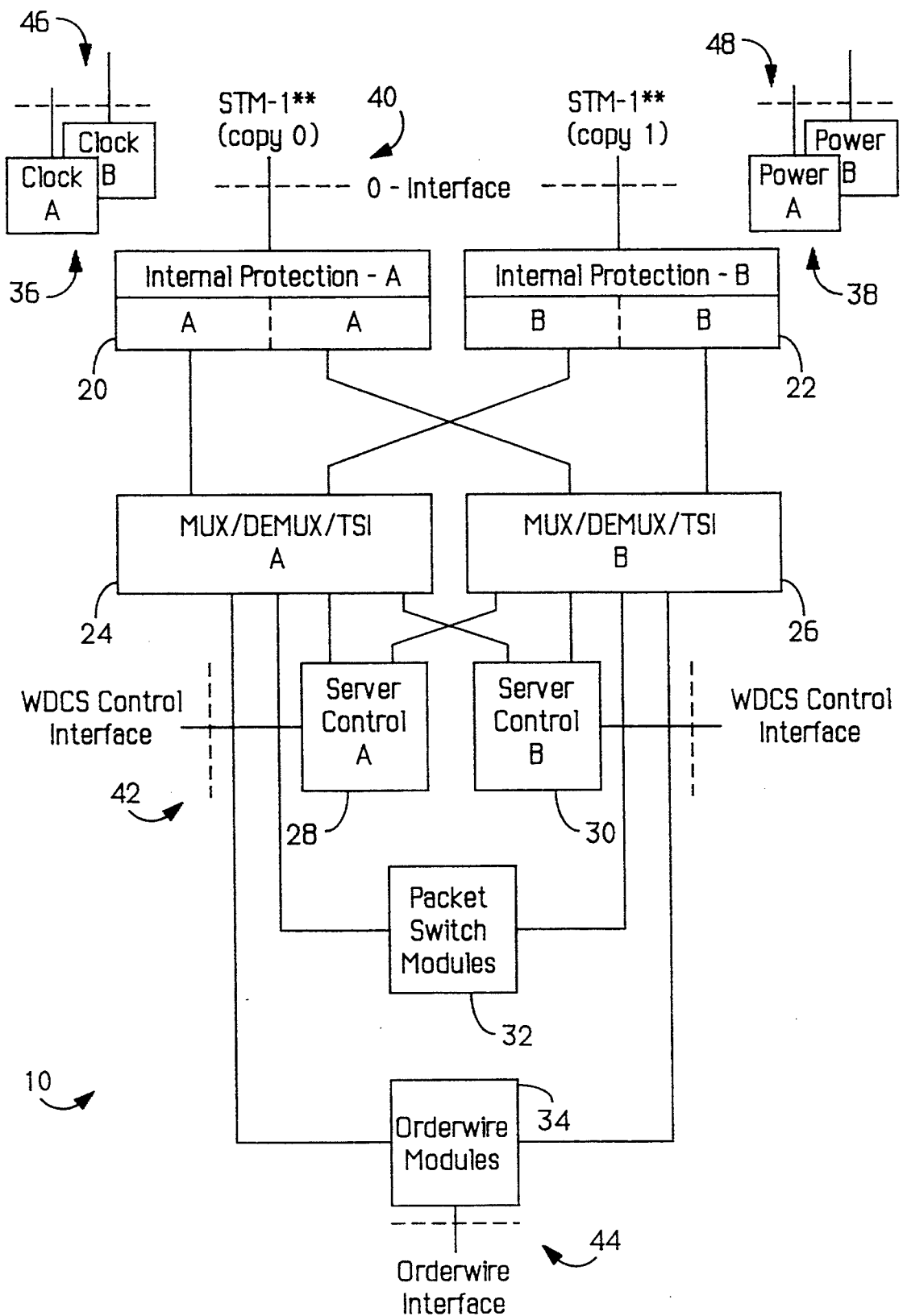
FIG. 2 shows details of a server such as shown in FIG. 1.

A server 10, according to the present invention, is shown in FIG. 1 as a part of a wideband digital cross-connect SWITCH (WDCS) 12, sometimes called a SONET cross-connect, including a cross-connect matrix, which may be a (VT) matrix 14, which may have a redundant mate (not shown), and a plurality of inputs 16 and outputs 18 for both SONET and non-SONET signals. The server 10 may consist, for example, of the following parts, as shown in FIG. 2, which shows a mirror image for redundancy for each item: internal protection units 20, 22, multiplexing/demultiplexing-/time slot interchanging units 24, 26, server controls 28, 30, switch modules 32, which may be packet switched modules for packet routing, orderwire modules 34 for circuit-switched orderwire line circuits, clocks 36 and power 38. External interfaces may include an O-interface 40 to the matrix 14, a control interface 42, an orderwire termination interface 44, a clock interface 46 and a power interface 48.

Referring back to FIG. 1, it will be seen that the server 10 is interconnected within the wideband digital cross-connect switch 12 by means of an STM-1** signal and, as may be seen in FIG. 2, may be interconnected through redundant control links.

The STM-1 signal is identical in overall structure to the STM-1 signal, except that some of the unused overhead bytes stripped off in the interfaces 16 are utilized within the switch 12 itself for internal housekeeping purposes. The overall structure of the STM-1 signal is shown in FIG. 4, to be discussed below, and is further disclosed in the above-referenced co-pending application, the details of which need not concern us here. It is also disclosed in French Patent Application 90 00991, filed Jan. 29, 1990.

The overhead information that is to be terminated in the WDCS 12 may be terminated in the input 16 or may be transported from any of the inputs 16 to the server 10, as indicated, for example, by path 50. That information, depending on the type, is either terminated in the user interface (e.g., orderwire) 44, or it is transported across the WDCS control interface 42 to the WDCS control system. Idle and undefined channels that are transported to the server 10 are terminated in the server.

The overhead information that is to be terminated in any operating systems (OS) which may be connected to the WDCS is transported from an input 16 to the server as indicated by the path 50 and transported across the WDCS control interface to the WDCS control system. The WDCS control system will interface the information to the appropriate user, in this case the OS interface.

The reverse of the above is true for the generation of the information locally, with the exception that the information is transported to the output over a path 52 from the server 10. Likewise for the idle and unused channels, i.e., the information will be generated in the server.

The other category of information in the overhead is information that is to be transported across the WDCS system, such as from input 56 to output n 54. Examples of such would be data communications channel (DCC) (e.g., D1–D3) overhead packets from one external network element (NE) to another external NE. The overhead packet is transported from an input 56 to the server, as indicated by the path 50. The packet is then disassembled to the layer necessary to determine its destination. Upon determining that its destination is required to pass through output n 54, the packet is reassembled and transported to output n by a path 58.

The organization of the STM-1 O-interface 40 that is the method of transport within the WDCS 12, may be a nine-row single column of bytes as the smallest switchable entity in the matrix. The STM-1 signal is a 155.520 Mb/s signal which interfaces the server 10 to the matrix 14. The format and content of the STM-1** at the interface 40 may be as shown in FIG. 4, for example. The overhead information is carried in columns 10–84 and 201–270. Framing is carried in row 1 of columns 1–6. Three columns contained in column 10–270 are to be reserved as STS-1 path overhead columns. All other byte locations are currently undefined. A set of overhead information that is transported may consist of a designated group of columns 1–9, such as STM-1 or similar, as I show for example in the above-mentioned co-pending application, depending on the type of I/O signals and the optioned overhead that is to be transported to the server 10. With each column of overhead is an associated connection supervision (CSN) byte. This CSN byte is incremented for administration and maintenance of server to I/O connections.

An overhead group of columns, associated with a specific I/O, may be mapped into the STM-1 legal payload areas such that, at the O-interface 40, the columns are located at an interval of 3 or a multiple thereof (e.g., columns 10, 13 & 16, or 15, 21 & 24). That is, if the STM-1 is byte disinterleaved into 50 Mb signals, the overhead groups will be wholly contained in one of the 50 Mb signals. Overhead bytes must be preserved in a sequential manner in order to preserve the integrity of the information. That is, for a given DCC packet such as D1–D3, the three bytes are order dependent and must be processed in the server in the same order as they are received at the I/O.

Undefined/unused and idle circuit-switched bytes in the overhead groups will be terminated with no further actions, and the generation thereof will be of value '0' transported to the I/Os. Idle packet channels will be properly terminated and generated in the packet switching units 32.

As shown in FIG. 2, the server will have one STM-1 access to the matrix O and one STM-1 access to the matrix 1. (Although for simplicity only one matrix 14 is shown in FIG. 1, it should be understood that there may be a second, redundant matrix provided.) The server 10 will process overhead channels from only one STM-1 access at a time. The server will determine the validity of the STM-1 connection by way of connection supervision bytes. If the STM-1 access is determined to be invalid by the server, the server will connect to the standby STM-1 access and check the validity of the standby. If the standby STM-1 access is determined to be faulty also, the server will switch back to the original STM-1 and report the results to the WDCS control system (not shown) through the interface 42. If the standby access is determined to be valid, the server will remain on the standby side and report the results to the WDCS control system.

Internal protection circuits 20, 22 may be provided on both sides, such that a failure the server will have no impact on the WDCS system, with one exception, i.e., the failure of the internal protection unit itself. When this occurs, the WDCS will only be operational on the matrix side connected to the non-faulty internal protection unit. To accommodate the redundant matrix access principle, in the case of a failed internal protection unit, two STM-1 interfaces would be required per matrix side instead of one, each matrix side to both internal protection units. It is presumed, in the embodiment shown, that the equipment penalty and usage of STM-1s to accommodate a double fault is not justified. However, such is, of course, possible.

The server 10 provides packet switching and circuit switching functionality, as shown by modules 32, 34. The STM-1** signal must be able to be decomposed and circuit-switched down to the DS0 (64 kb) signal level. It must be able to assign the circuit switching so as to preserve the integrity of the order of bytes, in particular for the packet-switching function.

The server 10 is based on the principle that it is operating in a locked mode. The locked mode principle means that the location of the overhead bytes, after the columns have been assigned on the STM-1**, remain in fixed positions relative to the framing bytes. This implies that controlled slips of the overhead, if required due to plesiochronous signals at the I/Os relative to the WDCS, are accommodated in the I/Os.

Loopback of any overhead channel is accommodated within the server for the high-speed STM-1** ports and the low-speed ports, such as the packet-switching modules 32.

Broadcasting capability may be accommodated in the server. This provides the ability to broadcast a specific idle code to a multiple number of overhead channels. For example, the idle code for non-packet overhead bytes may be an 'all-0' code.

The server 10 is able to provide 64 kb cross-connections within the STM-1** signals and to any termination interfaces within the server. The DS0 cross-connection capability is required for the termination of the orderwire channels as well as the termination of the OS channels to the server controller 28.

Any of the 64 kb channels terminating on the server will be able to be rearranged and/or grouped for whatever the application/implementation reasons may be.

It will be observed in FIG. 2 that server 10 complies with fairly stringent availability and reliability requirements, a basic principle adopted for redundancy/protection. The orderwire terminations need not be redundant, in that the n modules are selectable by the craft or OS, and failure of one unit is not critical. The packet-switching modules 32 are protected on an n+1 basis for economic reasons.

There are duplicated sides running in parallel and in synchronism. Each side is connected to the matrix or to both matrices, if two are provided, through its respective internal protection unit 24, 26. The controllers 28, 30 may interface to the WDCS control system through respective A and B sides. The packet-switched modules and orderwire interfaces select the A or B side for termination upon commands from the control and transmit to both the A and B sides.

Figure 3A:
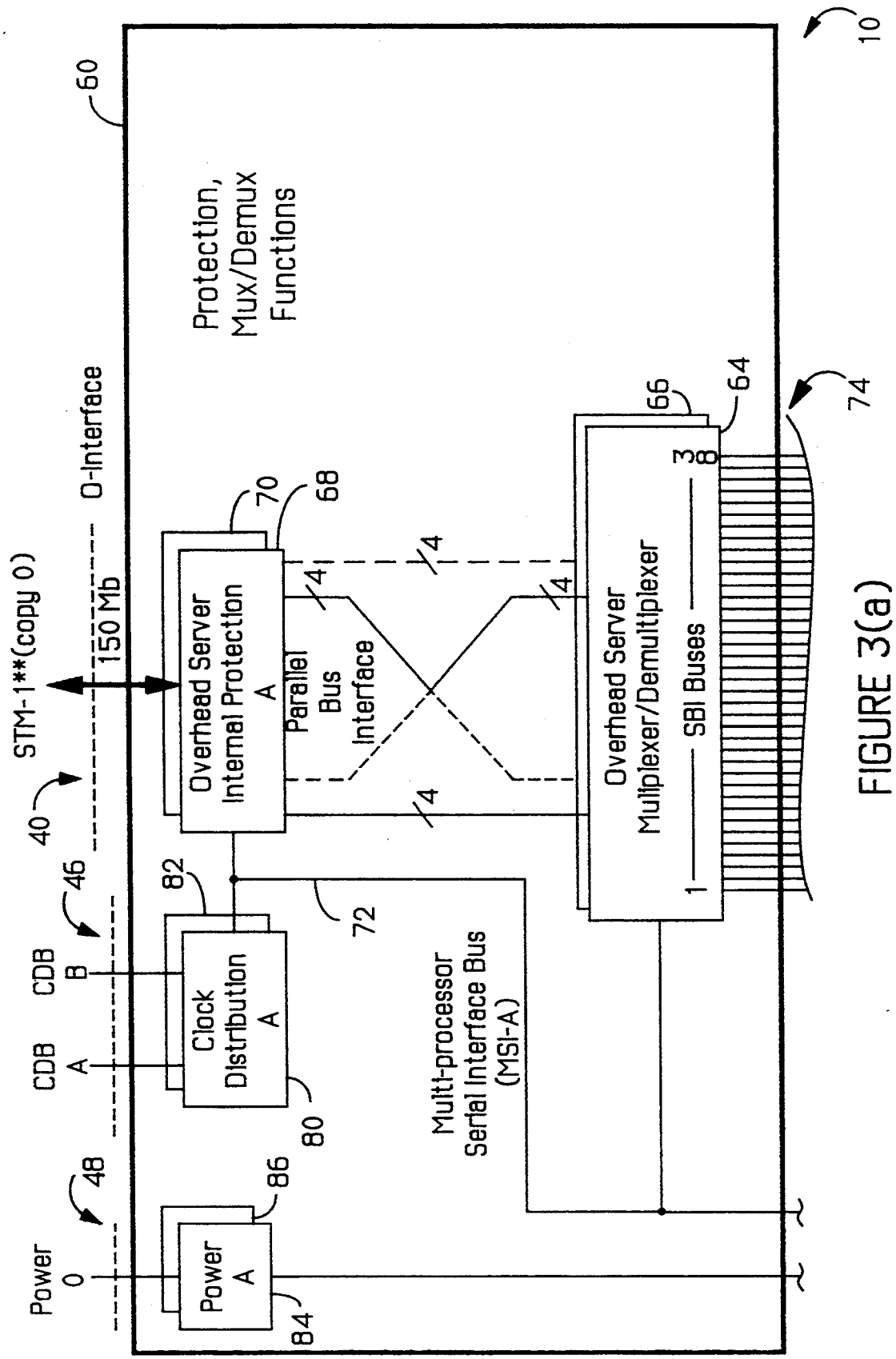
FIGS. 3(a) and 3(b) together show a server such as shown in FIG. 1 in even more detail.
Figure 3B:
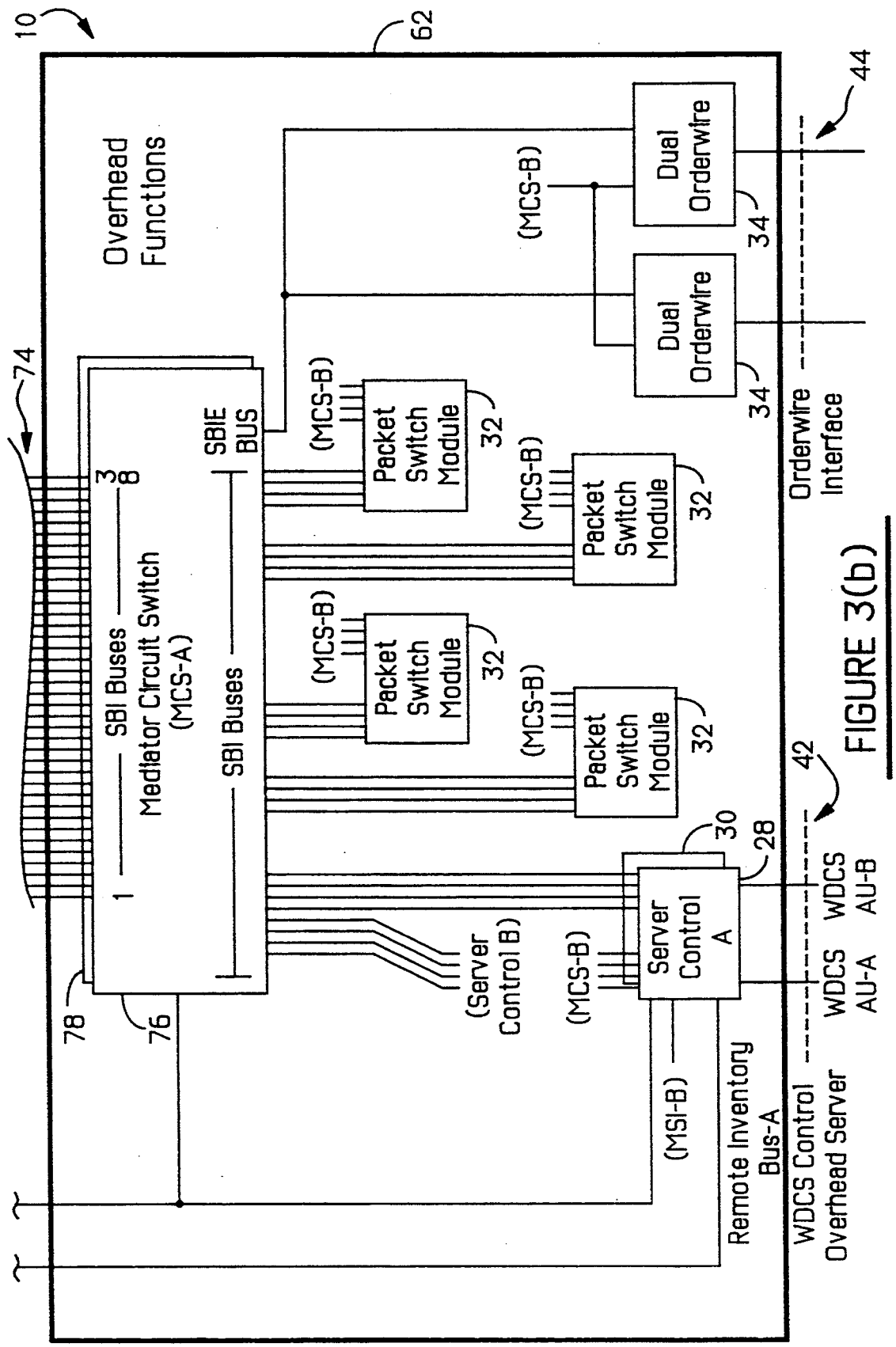

Referring to FIGS. 3(a) and 3(b), the server 10 of FIG. 2 is shown in the form of two major sub-blocks 60, 62, comprising a protection and MUX/DEMUX functional block 60 and an overhead functional block 62. The redundancy feature of FIG. 2 has been incorporated in FIGS. 3(a) and 3(b) by showing the redundant B side in some cases as a shadow block with shading behind the A block.

The unit 60 shown in FIG. 3(a) includes an internal protection 68, 70 which interfaces the STM-1** to the WDCS matrix 14. O-interface 40 itself is an external interface between the server 10 and the matrix 14. This interface operates at the standard 155.52 Mbps rate. This interface may transport the concentrated overhead, as shown in the above-mentioned co-pending application. Each unit 68, 70 provides protection so that failures in the server 10 will not have adverse impact on the rest of the WDCS system 12. Also, when another subsystem, external to the server, should change operation to the standby side, it prevents the server from being forced to its standby side. Each of the OSIP units 68, 70 therefore provides an A/B selection mechanism which in the receive direction selects either A or B and in the transmit direction transmits identical signals.

The internal protection unit synchronizes on the incoming STM-1 input, receives the STM-1 signal and provides two output STM-1 signals on a parallel bus to the MUX/DEMUX units 64, 66. The parallel bus is an internal interface that transports the STM-1 signals from the internal protection unit to the multiplexer/demultiplexer unit. The 155 Mb STM-1 signal is decomposed into a set of lower speed parallel buses. In the reverse direction, the OSIP receives two STM-1 parallel signals from the MUX/DEMUX units and transmits one of them to the WDCS matrix 14. The selection is made by the server controller 28.

Clocks are sent to the OSIPs 68, 70 from the clock interface 46, and the remote inventory and management functions may be performed over a multi-processor serial interface (MSI) bus 72, such as A/B selection, loss of frame, etc.

The multi-processor serial interface bus 72 may be an asynchronous serial interface which operates via stop and start bits, e.g. with a data rate of 128 kbps. The serial bus protocol may be based on the Intel Microcontroller Mode 2 operation. This is an asynchronous protocol which involves a start bit, eight data bits, program bit and stop bit.

The multiplexer/demultiplexer 64 may, for example, multiplex and demultiplex the parallel STM-1 signals from internal protection unit 68 into a serial bus interface (SBI) 74 and on to mediator circuit switch (MCS) units 76, 78. The serial bus interface is an internal interface which operates at a rate of 4.096 MHz and is shown in more detail in U.S. Pat. No. 5,060,229 to Tyrrell et al. However, another mode of connection may be used. Within the server 10, there may be two types of SBI interfaces, and SBI-B and an SBI-E. The SBI-B is an SBI-link that is organized as a 64 8-bit (a byte) time-slot with B suffix indicating the byte-wide time-slot organization of the link. The SBI-B is a point-to-point carrier link from which bit and byte synchronization are recovered. FIG. 5 shows the organization of the SBI-B and SBI-E links. The SBI-E is an SBI link that is organized as 64 8-bit (a byte) time-slots, with E suffix indicating explicit timing signals. The SBI-E is not a point-to-point as the SBI-B, but rather a shared serial, tri-state bus with explicit timing signals defining bit, byte and addressing. The multiplexer/demultiplexers 64, 66 provide the same A/B selection function as the internal protection units 68, 70. Primarily, however, it maps, in a fixed pattern, the channels from the STM-1 to the SBI channels. Clocks are provided to this unit over the clock interface 46. Remote monitor and management functions are performed over the MSI bus 72, such as A/B selection, loss of frame, etc.

The mediator circuit switch (MCS) 76, 78 of FIG. 3(b) performs the following primary functions for the server:

Time slot interchanging of 64 kb channels
Termination of idle overhead channels
Concentration of packet channels
Circuit switching of PCM channels
Providing control channels
System clock selection/distribution
SBI bus 74 control.

The packet-switched modules 32 route packets through the server 10. They also provide for idle terminations and concentrate traffic. The packets are transmitted and received over the SBI buses 74 that are connected to the MCS 76, 78. The packet-switched modules communicate to the server control over a channel n in SBI bus 74. One of the packet-switched modules 32 is designated as the n+1 module in case of a module failure. When the n+1 module must take over for a failed module, the configuration and maps associated with the failed module are transported to the n+1 module by the server control 28.

The orderwire interface 44 is an external interface between the dual orderwire units 34 and an orderwire termination circuit. This interface is a four-wire analog interface.

The server control 28 operates on the input and output data as follows:
Input data flow
Connection orders received from the control system
Remote inventory requests
DCC packets for this WDCS NE-type connections
DCC packets for the OS-type connections
Management queries
Output data flow
Loss of STM-1**
Connection responses to the control system
Remote inventory responses
DCC packets from this WDCS NE-type connections
DCC packets from the OS-type connections
Management responses
Alarms The dual orderwire units 34 provide for the termination of active and selected local and express orderwires.

A clock distribution 80, 82 in FIG. 3(a) provides all the necessary clocks for the server 10 of FIGS. 3(a) and 3(b). Power supplies 84, 86 convert a negative 48-volt nominal station battery voltage to +5.0 and −5.2 voltage as required by the server 10. External power to the overhead server is redundant negative 48-volt office battery A and B. The distributions are individually fused outside the server 10.

The WDCS control interface 42 is an external interface that connects the WDCS control to the server 10.

Figure 6:
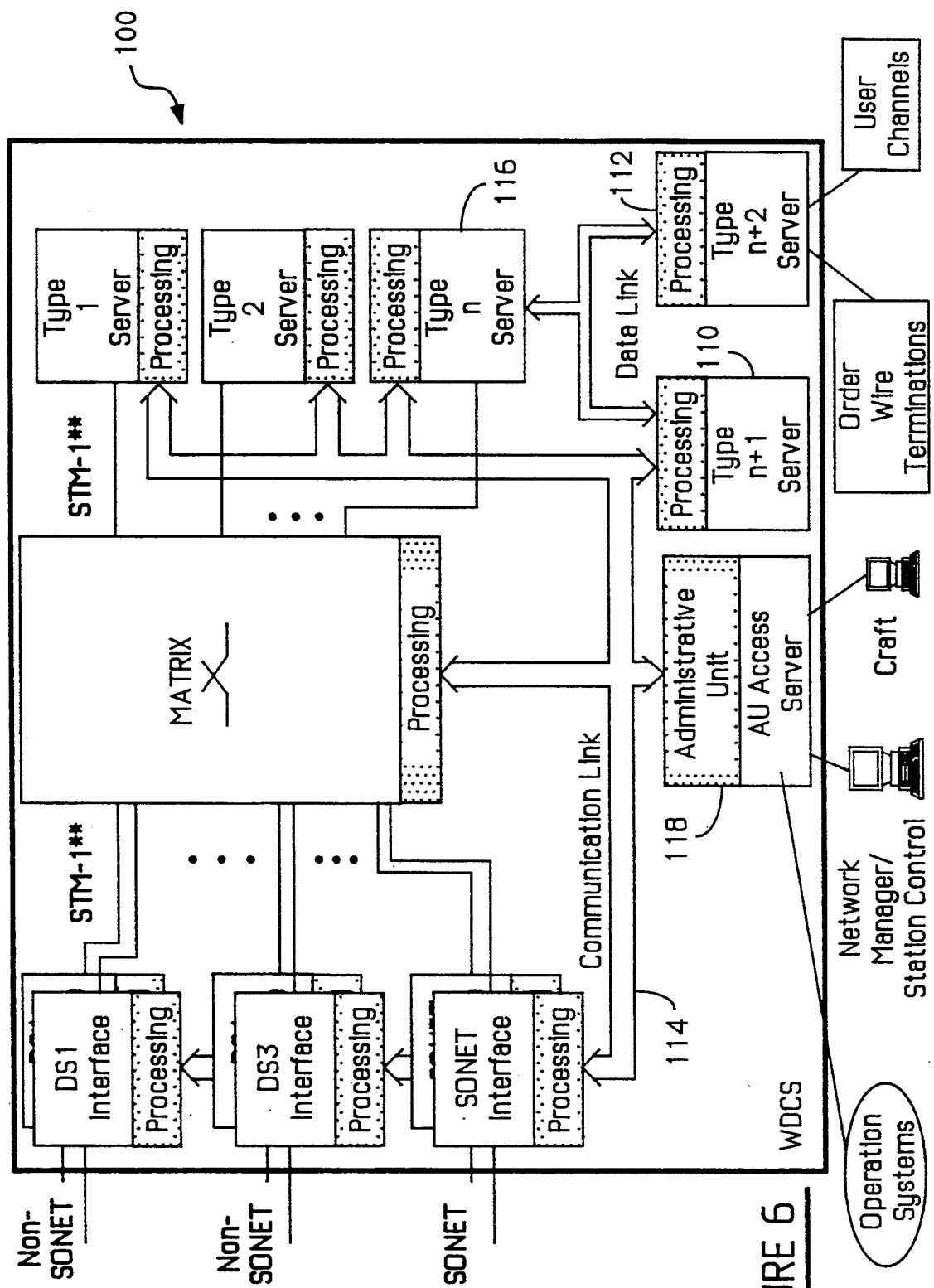
FIG. 6 shows a SONET cross-connect architecture with which one or more servers, according to the present invention, may be used.

A SONET cross-connect architecture, with which a server, according to the present invention, may be used, is shown in FIG. 6. A basic concept of the architecture shown is to provide for common functional building blocks and standard interfaces that can be reused in the various elements of the SONET cross-connect (WDCS) and which may be even reused in other SONET-type products, such as interface elements and timeslot interchangers.

Some of the server functions that are or may be required are:
DS0 interchanging.
Data communications packet handling and processing.
Growth channel termination.
User channel termination.
Orderwire termination.
National use overhead termination.
Network management communication with:
craft operators.
operation systems.
No. 2SCCS.
Assignee's network management equipment.
Other vendor equipment.

The concept of the architecture as shown in FIG. 6 is for the SONET cross-connect to provide functional units identified as servers and intercommunication links. The concept is to have the following communication type of links:
STM-1**.
Processor to processor.
Server to server data link.

The concept of the STM-1 communication link is to allow for communication from server to server, server-to-interfaces and interfaces-to-interfaces by using available overhead bandwidth in the STM-1 frame. The primary function of this link is to provide a fixed information carrier based on the type of interfaces and servers identified. It takes advantage of the fact that some of the SONET overhead is terminated in the interfaces and therefore selected bytes are made available for intra-SONET cross-connect usage. The processors within the SONET cross-connect communicate over a communication link appropriate to the control architecture for the SONET cross-connect. The server-to-server data link provides for direct connection between servers where it is most appropriate to segregate functions into separate servers.

The concept as shown in FIG. 6 identifies the idea of subservient servers, including a type n+1 server and a type n+2 server 110, 112, and an appropriate communication link 114 between the servers. This is to allow for flexibility, future functional growth, modularity and fault tolerance identified above. An appropriate example of a subservient server could be when a type n server 116 is a DS0 interchanger and the type n+2 server 112 is a termination unit for the orderwires and user channels. Termination of assignee's SONET products, for example, with the DS1 data link (TM, ADM, FTS, ...) could possibly terminate directly on this DS0 interchanger 116 or by way of an interface server such as the type n+2 server 112. The type n+1 server could be applicable for data communications packet handling and processing, where the datacom information is directed to it through the DS0 interchanger and communication with the SONET cross-connect 100 is accomplished over the processor communication link 114.

Figure 7:
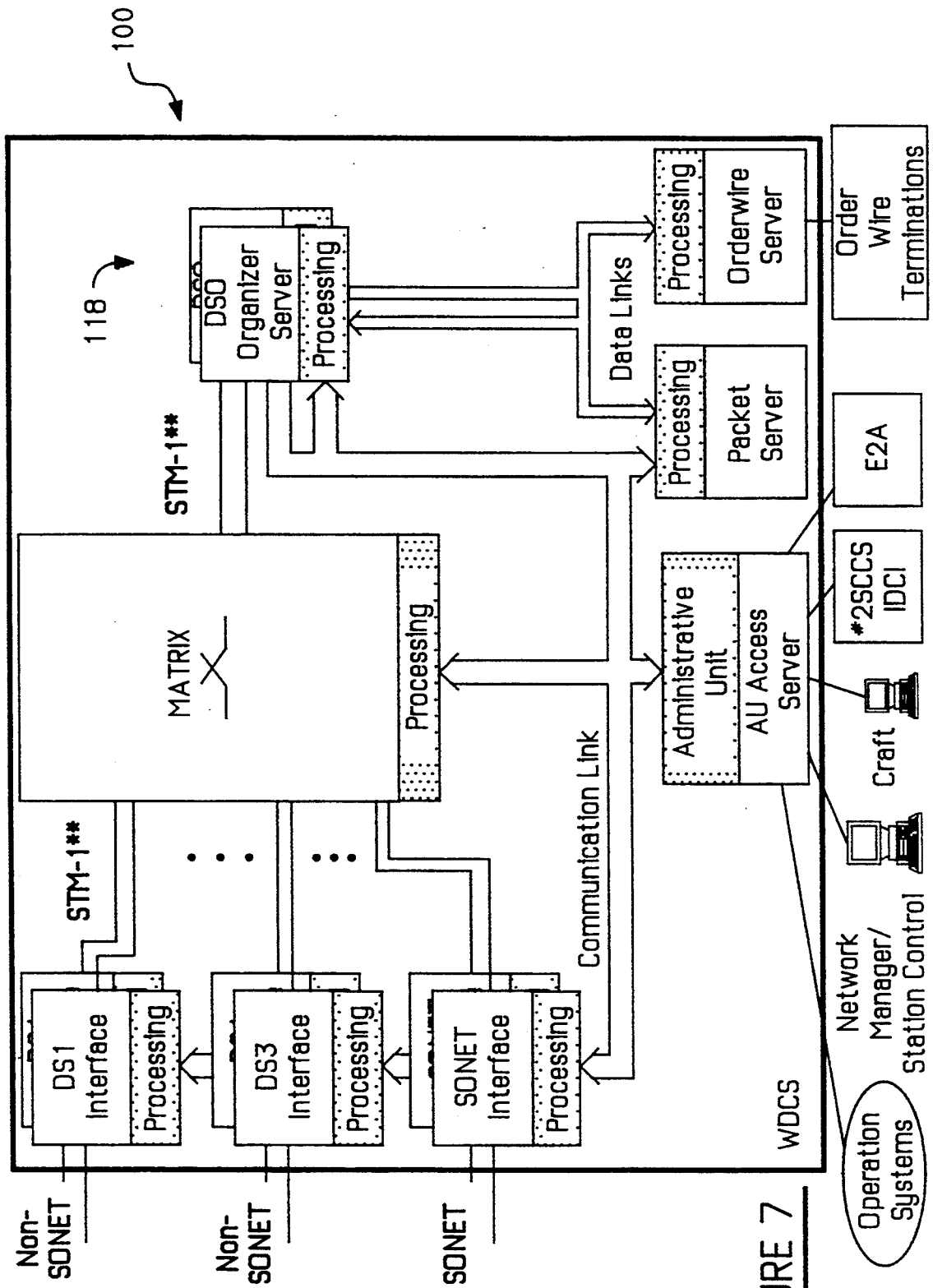
FIG. 7 shows a network element having a DS0 organizer server having a subservient packet server and orderwire server.

FIG. 7 shows a DS0 organizer server 118 having a subservient packet server and orderwire server.

The concept of providing pseudo-VTs, as disclosed in the above-mentioned co-pending application, that contain floating overhead data can also be accommodated by this architecture. The overhead in the floating VTs could be handled by a server directly connected to the matrix by a STM-1**. This server would DEMUX/MUX the data by type and pass it on to subservient servers. It could also be passed through an intermediate DS0 interchanger as a VT1.5 between the matrix and the MUX/DEMUX.

An administrative unit 118 shown in FIG. 6 is described in more detail below, and it is architecturally and functionally important here to provide for the completeness of the externally-imposed requirements of the network management aspects for the SONET cross-connect 100.

With regard to SONET overhead functional requirements, various overhead functions are or may be dealt with as described in detail below. These include DS0 matrix functions, section data communication channels (D1, D2 and D3), line (section) data communication channel (D4–D12), orderwire (E1 & E2), section user channel (F1), path user channel (F2), growth (Z1, Z2, Z3, Z4, Z5) and national use bytes (Xrc).

The DS0 matrix function is provided by a server, allowing the capability to interchange and organize byte information into pseudo VT-1.5s which can be directed to other servers connected by STM-1** interfaces to the matrix. The server will provide the following functions:
Receive an STM-1** containing the pseudo TU/VTs from the SONET and non-SONET interfaces.
Organize the content of the pseudo TU/VTs and transmit to the SONET and non-SONET interfaces by way of the matrix on an STM-1**.
Organize the content of the pseudo TU/VTs and transmit/receive to other servers.
Communicate to other equipment by way of standard interfaces.

Section Data Communication Channel (D1, D2 and D3)

Received Signal: The received D1–D3 bytes will be mapped into the STM-1** frame for transport through the WDCS matrix to a server. The D bytes will be terminated in this server, which will provide the appropriate functions on the datacom channels, such as:

Routing through the matrix to a destination outside the WDCS.

Routing to another designated server within the WDCS.

Processing of the information intended for the WDCS.

Communicating to the WDCS control.

Terminating idle datacom channels.

Transmitted Signal: The transmitted D1–D3 bytes will be mapped into the external SONET signal from the STM-1** frame that is transporting the D1–D3 bytes through the matrix. The bytes will originate from a server for information that originates in the WDCS and for the idle datacom channels. For datacom channels that are to pass through the WDCS, such as from another SONET NE or an OS, the byte information is generated external to the WDCS and routed through the appropriate DS0 interchanging server and routing server.

Line (Section) Data Communication Channel (D4–D12)

Received Signal: The received D4–D12 bytes will be mapped into the internal STM-1** frame for transport through the WDCS matrix to a server to be terminated and ignored.

Transmitted Signal: The transmitted D4–D12 bytes will be mapped into the external SONET signal from the internal STM-1 frame that is transporting the D4–D12 bytes through the WDCS matrix. A server will generate an idle pattern for the D4–D12 bytes and transmit them to the external SONET signal on the STM-1.

Orderwire (E1, E2)

Received Signal: The received E1 and E2 bytes will be mapped into the internal STM-1** frame for transport through the WDCS matrix. A switched circuit function will be performed in a server which receives selection commands form network management. Orderwires that have been selected by network management will be terminated to an external four-wire analog port. Termination of unselected orderwires will be terminated in the DS0 interchanging server.

Transmitted Signal: The transmitted E1 and E2 bytes will be mapped into the external SONET signal from the internal STM-1** frame that is transporting the E1 and E2 bytes through the WDCS matrix. A switched circuit function will be performed in the DS0 interchanger server which receives selection commands from network management. Orderwires that have been selected by network management will have the E1 and E2 bytes generated from information received from the external termination four-wire analog port. The E1 and E2 bytes from unselected orderwires will be generated in the DS0 interchanger server as idle codes.

Section User Channel (F1)

Received Signal: The received F1 bytes will be mapped into the internal STM-1** frame for transport through the WDCS matrix to a server to be terminated and ignored.

Transmitted Signal: The transmitted F1 bytes will be mapped into the external SONET signal from the internal STM-1 frame that is transporting the F1 bytes through the WDCS matrix. A server will generate an idle pattern for the F1 bytes and transmit them to the external SONET signal on the STM-1.

Path User Channel (F2)

Received Signal: Requirement—When the path is matrixed to another SONET signal, the F2 bytes are transparently passed through the WDCS. Objective—When the path is matrixed to a non-SONET (ex. DS3) interface, the F2 bytes will be remapped at the non-SONET interface into the internal STM-1 frame for transport through the matrix to a server where they will be terminated and ignored. The received F2 bytes, when the path is terminated at the SONET interface, will be mapped into the internal STM-1 frame for transport through the WDCS matrix to a server where they will be terminated and ignored.

Transmitted Signal: Requirement—When the path is matrixed from another SONET signal, the F2 bytes are transparently passed through the WDCS on the path overhead. Objective—F2 bytes will be mapped into the external SONET signal from the internal STM-1 fame that is transporting the F2 bytes through the WDCS matrix. When the path is matrixed from a non-SONET (ex. DS3) interface, the non-SO"NET interface maps the idle F2 code onto the path overhead that it receives from the internal STM-1 from a server generating the idle code. For those signals terminating in the SO"NET interface, the idle code is received from a server over the STM-1**.

Growth (Z1 and Z2)

Received Signal: The received Z1 and Z2 bytes will be mapped into the internal STM-1** frame for transport through the WDCS matrix to a server to be terminated and ignored.

Transmitted Signal: The transmitted Z1 and Z2 bytes will be mapped into the external SONET signal from the internal STM-1 frame that is transporting the Z1 and Z2 bytes through the WDCS matrix. A server will generate an idle pattern for the Z1 and Z2 bytes and transmit them to the external SONET signal on the STM-1.

Growth (Z3–Z5)

Received Signal: Requirement—When the path is matrixed to another SONET signal, the Z3–Z5 bytes are transparently passed through the WDCS. Objective—When the path is matrixed to a non-SONET (ex. DS3) interface, the Z3–Z5 bytes will be remapped at the non-SONET interface into the internal STM-1 frame for transport through the matrix to a server where they will be terminated and ignored. The received Z3–Z5 bytes, when the path is terminated at the SONET interface, will be mapped into the internal STM-1 frame for transport through the WDCS matrix to a server where they will be terminated and ignored.

Transmitted Signal: Requirement—When the path is matrixed from another SONET signal, the Z3–Z5 bytes are transparently passed through the WDCS on the path overhead. Objective—Z3–Z5 bytes will be mapped into the external SONET signal from the internal STM-1 frame that is transporting the Z3–Z5 bytes through the WDCS matrix. When the path is matrixed from a non-SONET (ex. DS3) interface, the non-SONET interface maps the idle Z3–Z5 code onto the path overhead that it receives from the internal STM-1 from a server generating the idle code. For those signals terminating in the SONET interface, the idle code is received from a server over the STM-1**.

National Use Bytes (Xrc)

Upgrade provisions shall be made in WDCS for the future use when requirements are defined.

Figure 8:
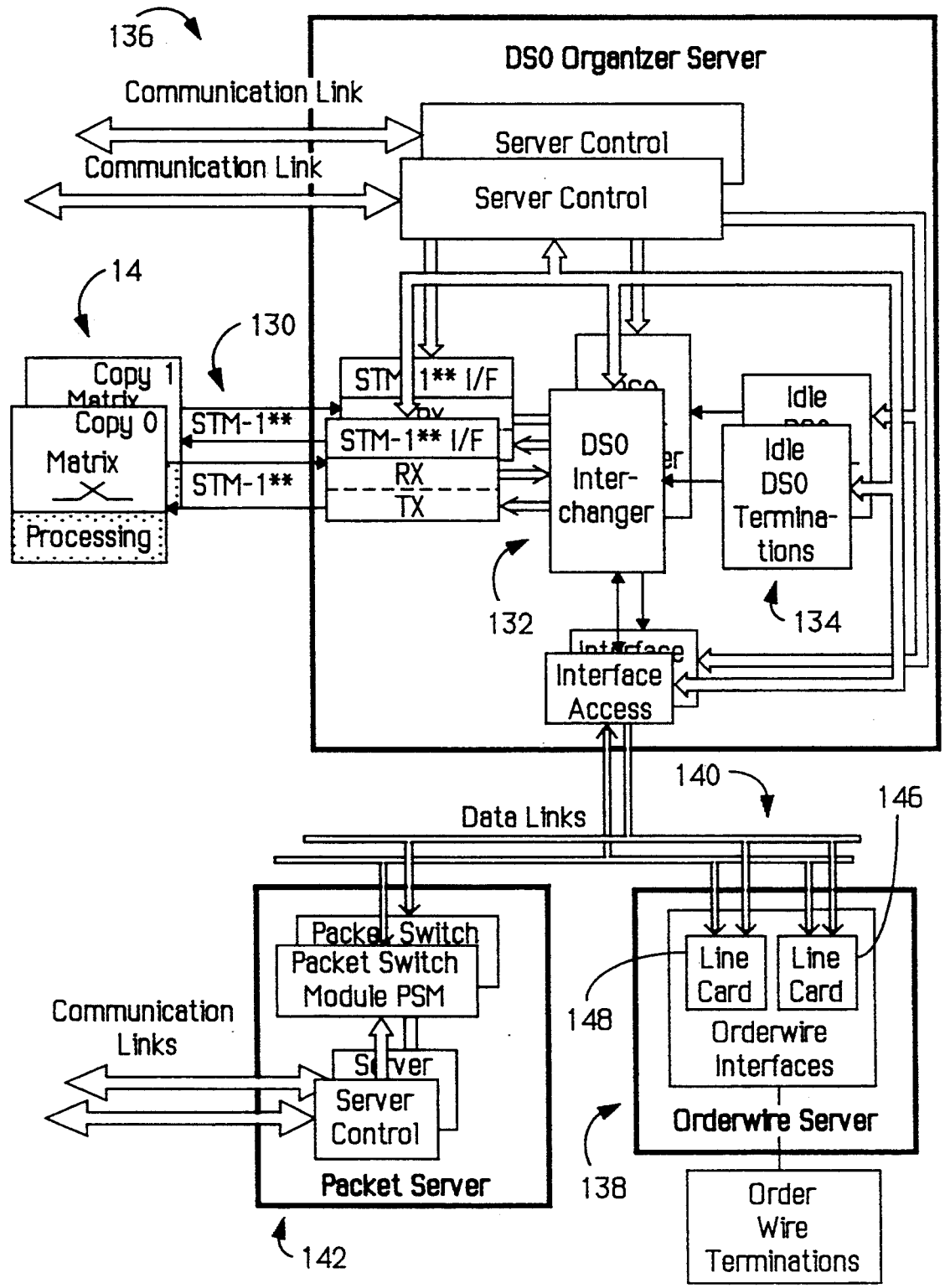
FIG. 8 shows the DS0 organizer of FIG. 7 in more detail.

FIG. 8 shows the DS0 organizer server 118 of FIG. 7 in more detail. The elements of this server are to be redundant for reliability and availability requirements, as suggested in FIG. 7. The functions that it is to provide are:

Interface to the matrix 14 via the STM-1** interface 130.

Provide timeslot interchanging 132 at the DS0 level for overhead byte reorganization.

Provide idle termination 134 codes for unused overheads.

Terminate idle/unused overhead bytes.

Provide communications with the SONET cross-connect control via SONET cross-connect communication links 136.

Provide interface to orderwire server 138 via data links 140.

Provide interface to packet server 142 via data links 140.

Circuit switch selection/routing 138 of the order wire circuits.

The definition of the interfaces for the above are covered below. With synchronization of the overhead completed in the interfaces, the requirement on the DS0 interchanger for the overhead functions is considered to be a locked-mode timeslot interchanger.

The orderwire server 138 of FIG. 8 is a subservient simplex server. It provides a simplex connection to the orderwire terminations. Redundant data links from the DS0 organizer server are brought in through line cards 146, 148. The server may be a modular unit and the line card growth requirement is thus flexible. The orderwires may be selected via network management, for example, by a craft command. If all orderwires require continuous on-line monitoring, an additional monitoring unit will be required.

The packet server 142 of FIG. 8 is also a subservient server with redundant units. The functions that it performs are:

Termination of idle data communications overhead channels.

Re-routing of packets to other network elements.

Communication with the SONET cross-connect control via the communication link 136.

Processing of the data communications overhead for the SONET cross-connect.

Figure 9:
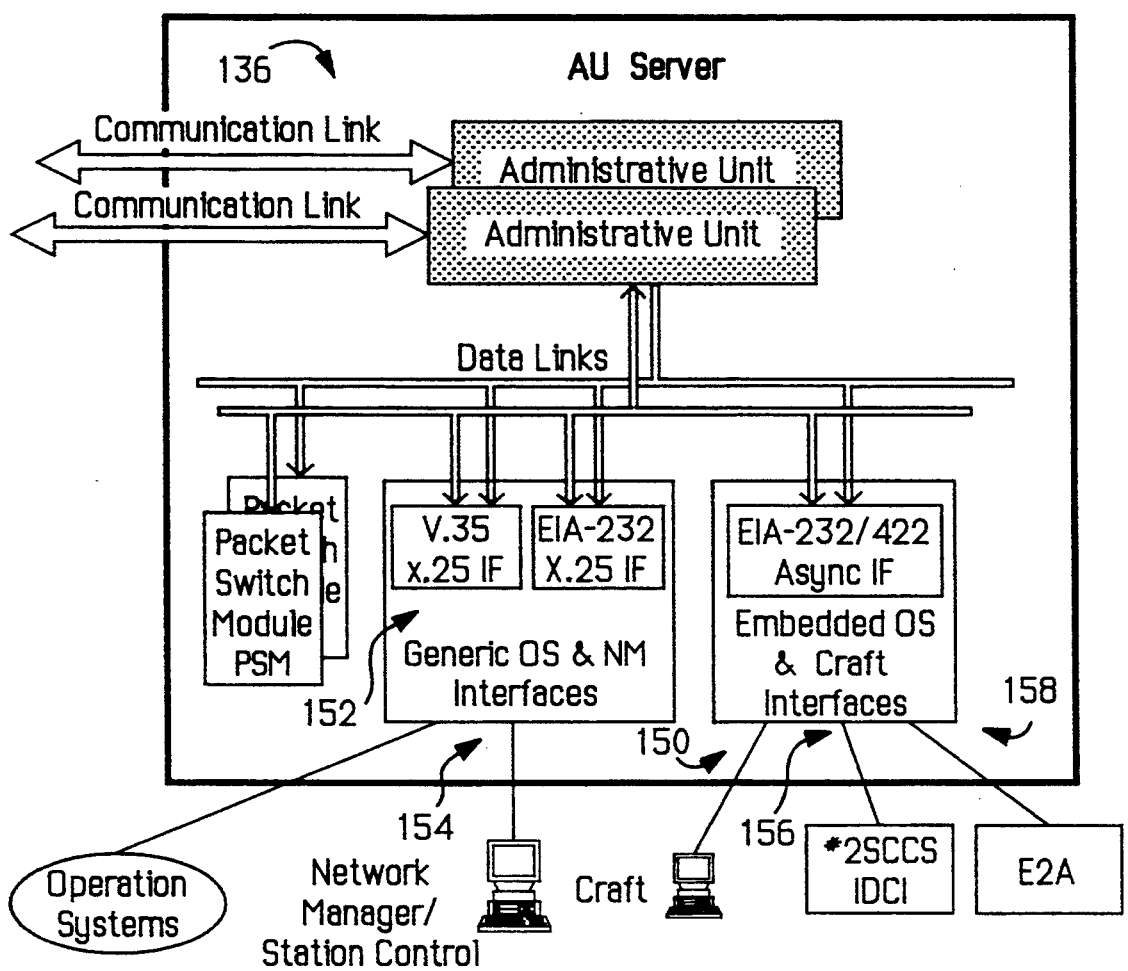
FIG. 9 shows an administrative unit server.

An administrative unit (AU) server is shown in FIG. 9. The administrative unit may perform functions associated with network management as follows:

Provide communication with other SONET cross-connect control via the SONET cross-connect communication links 136.

Local craft access 150.

Remote craft access.

Remote craft access via dial-up line.

Remote craft access via SONET relay.

Dialog modes.

Security.

Centralized alarm message display.

Generic OS×0.25 interface 152.

Network manager/station control interface 154.

No. 2 SCC IDCI interface 156.

Serial E2A interface 158.

Concentrated E2A for both remote and co-located NEs.

EOC sub-network provisioning.

Sub-network directory services.

Packet switching services.

Alternate message routing.

Sub-network interfaces for different products.

With regard to the generic OS×0.25 interface 152, this interface is interfaced to the generic OSs and may interface to other products. This transparent interface will permit a number of logical channels to share a single physical OS interface. The generic OS interface may meet the requirements as defined in Bellcore TR-TSY-000828. The following physical interface may also be provided: EIA-232-D (supersedes RS-232) and V.35. The network manager/station control interface 154 may be the generic OS×0.25 operations channel interface.

The No. 2 SCCS IDCI interface is defined in Bellcore TR-TSY-000387. This interface requires 3 RS-232C channels from the SONET cross-connect to the 2SCCS: a maintenance IO channel, in emergency action interface control and display channel, and a critical indicator channel.

The serial E2A interface (see Pub. 49001, Requirements for Compatibility of Telecommunications Equipment with Bell Systems Surveillance and Control Systems), provides surveillance and command through a serial data link from the SONET cross-connect to an alarm processing remote and the site location of the SONET cross-connect.

The concentrated serial E2A (remote NEs), Ref. Pub. 49001, consolidates serial E2A surveillance and control for up to eight individual remote NEs into a single serial data link port to an alarm processing remote at the site location of the SONET cross-connect.

A packet switch module is capable of supporting the packet switching of packets received from the subtending NEs via a DS1 link. The DS1 link is capable of carrying all the SONET overhead bytes from a subtending NE to the SONET cross-connect. The SONET cross-connect is capable of packet switching all of the SONET sectional or line DCCs from one attached NE to any of the DCCs of another attached NE. This includes the possibility of having to packet switch information from either a SONET line and/or section DCC or a single CCITT STM DCC (which is the concatenation of the line and section DCCs).

With regard to local craft access, at least one craft interface device port 150 provides a point suitable for maintenance access by local craft. The primary purposes of the local craft access port are installation and maintenance of the SONET cross-connect itself. The existence of the local craft access does not preclude operations on the SONET cross-connect from other craft access ports. However, for the purpose of insuring control during maintenance or diagnostics, craft is able to take priority via the local craft access over other access ports.

Often craft personnel at a work center will be operating on the network via work stations which will often be located sufficiently distant from the SONET cross-connect and its co-located subtending NE equipment to be considered remote and thus require some special treatment in the form of either a modem or relay via the SONET section DCC. Connections to the SONET cross-connect may or may not involve modems or other communications equipment. Thus, for the remainder of the craft access ports which are designated remote craft access, front access to the equipment is inappropriate. Remote craft access may support remote access via dial-up lines. Remote craft access via SONET relay or remote log-in provides a mechanism by which craft locate at a remote NE can gain access to and log onto the SONET cross-connect. Remote sessions are initiated and craft messages are sent via SONET section (D1-D3) DCCs between the remote NE and WDCS. Administration of remote log-in is from the SONET cross-connect.

The SONET cross-connect supports the craft dialog mode of TA-TSY-000204, the security features of TA-TSY-000308 and 000309.

A centralized alarm-message display provides a point for displaying designated alarm messages arising autonomously from the sub-network on up to four separate craft interface devices.

Figure 9A:
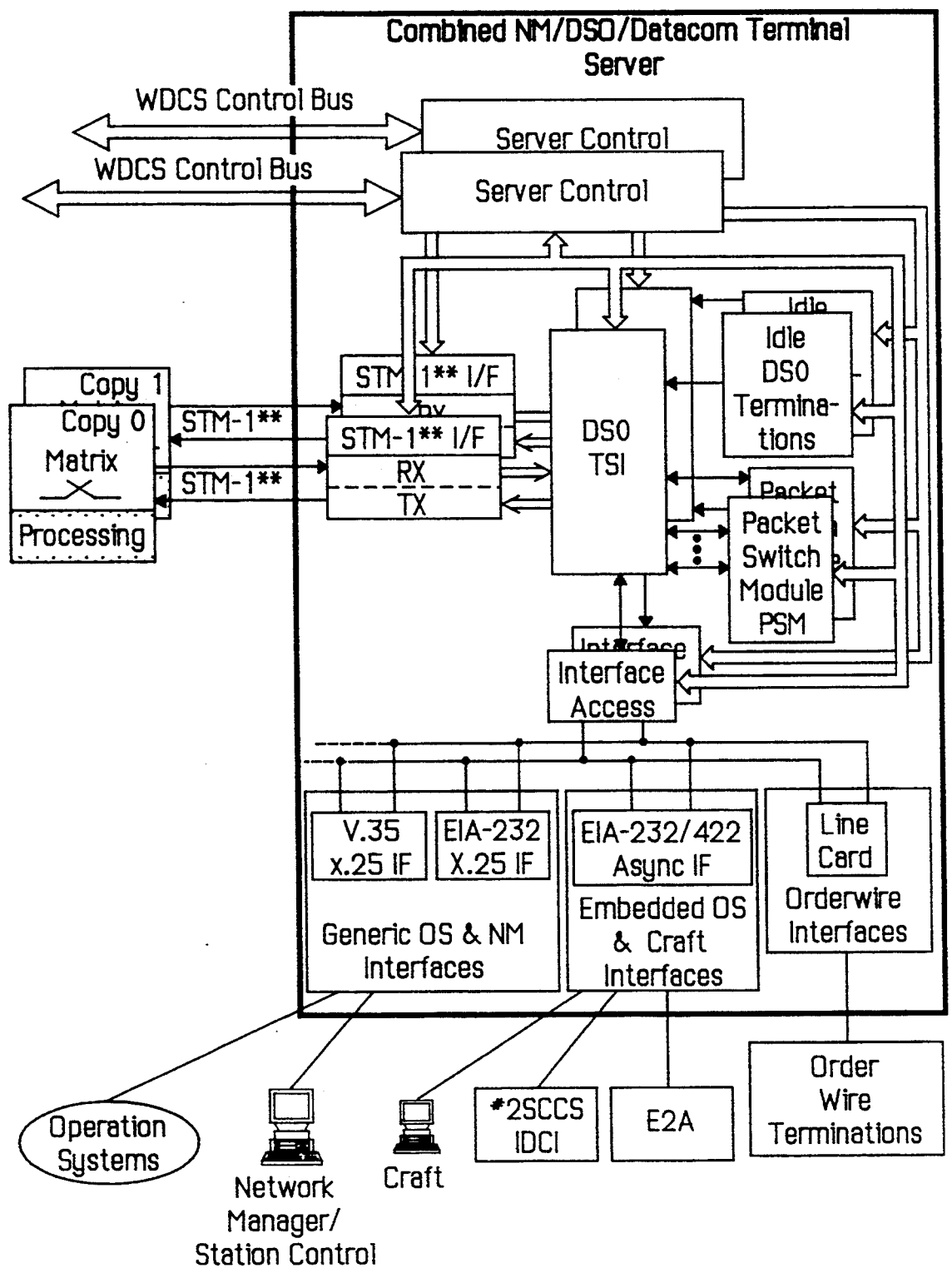
FIG. 9A is an illustration of how some of the various possible types of servers can be combined into one server, for example.

It should be realized that numerous functions may be split into different servers or combined on particular servers as shown in brief, for example, in FIG. 9A. Various other modifications and changes to the basic server concept may be made without departing from the spirit and scope of the invention as claimed below.

Referring now to FIGS. 10-21, it is shown how a server, according to the present invention, may be interconnected to a matrix such as the VT matrix 14 of FIG. 1 in various different ways.

Figure 10:
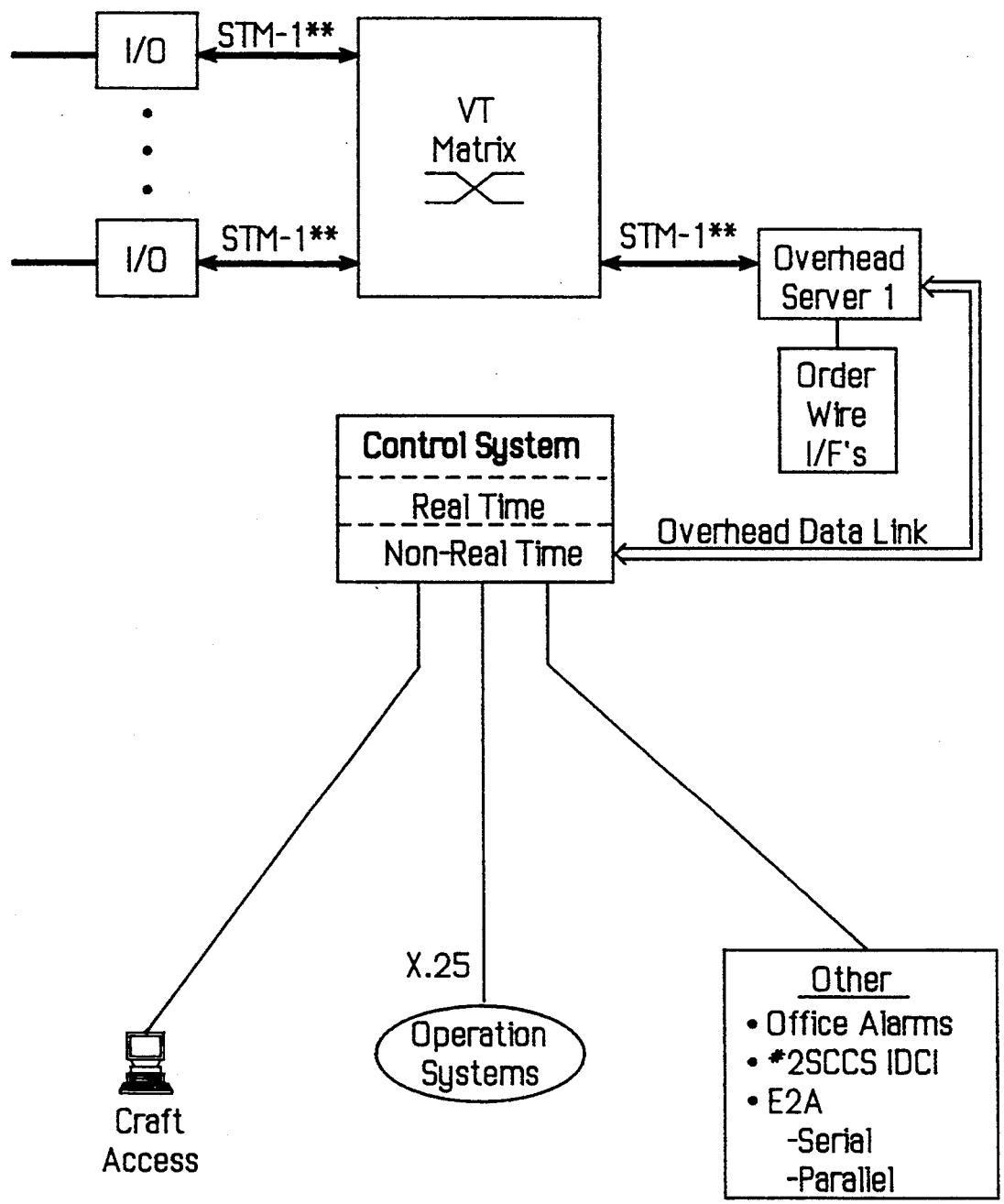
FIG. 10 shows a single overhead server with a single STM-1** interface.

Thus, a single overhead server with a single STM-1** interface, as shown in FIG. 10, may be adequate for small cross-connect systems, or where there is a small amount of SONET overhead to be processed. If no additional capacity is ever needed, then the only sub-networking for the overhead is contained within the server itself. In this simplest configuration, the networking for the overhead is all handled in the one server and routed to any of the I/O ports.

Figure 11:
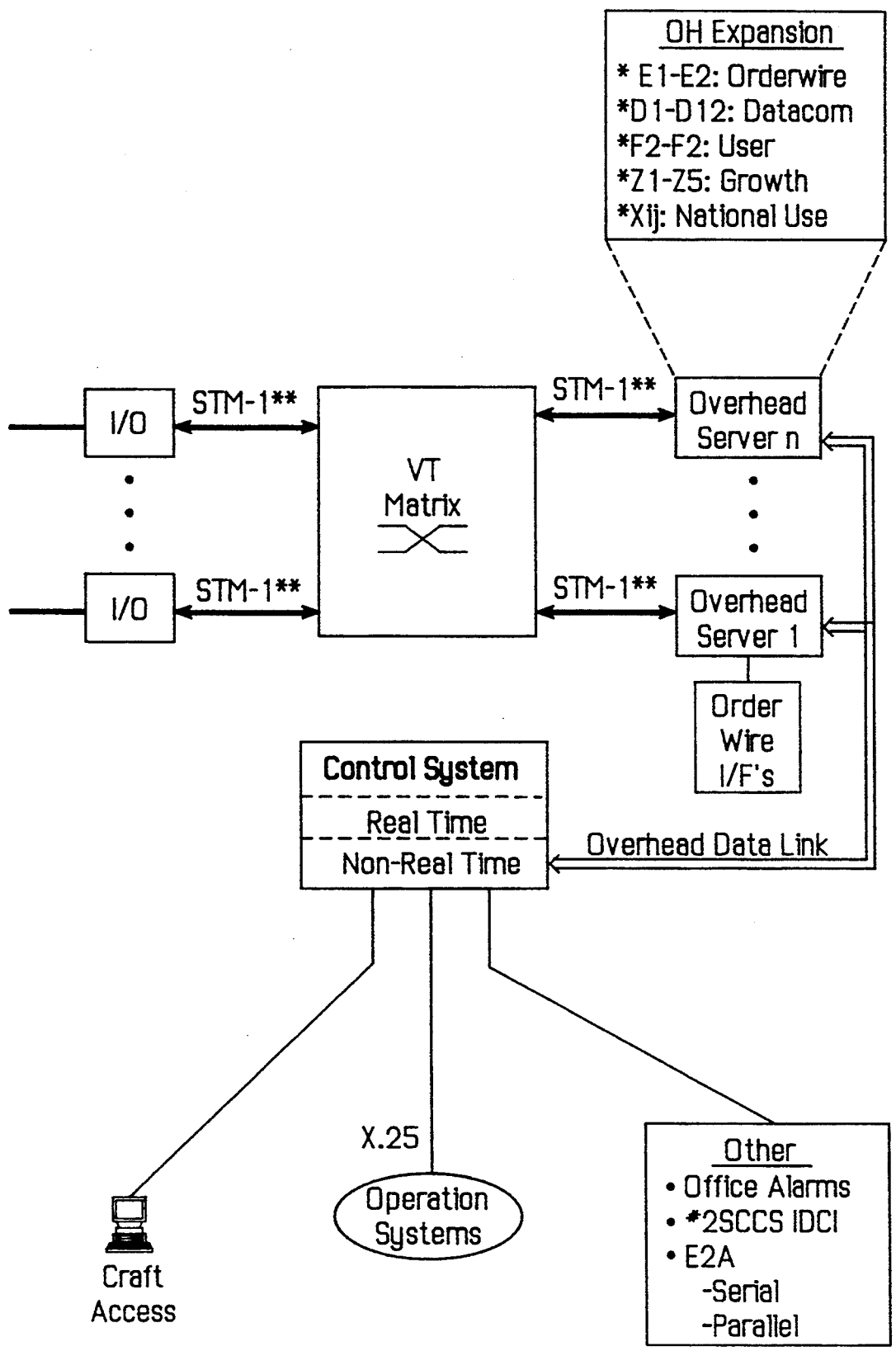
FIG. 11 shows more than one overhead server, each with an STM-1** interface.

A second configuration is where there are needs for more than one overhead server, as shown in FIG. 11, each with an STM-1** interface.

Figure 12:
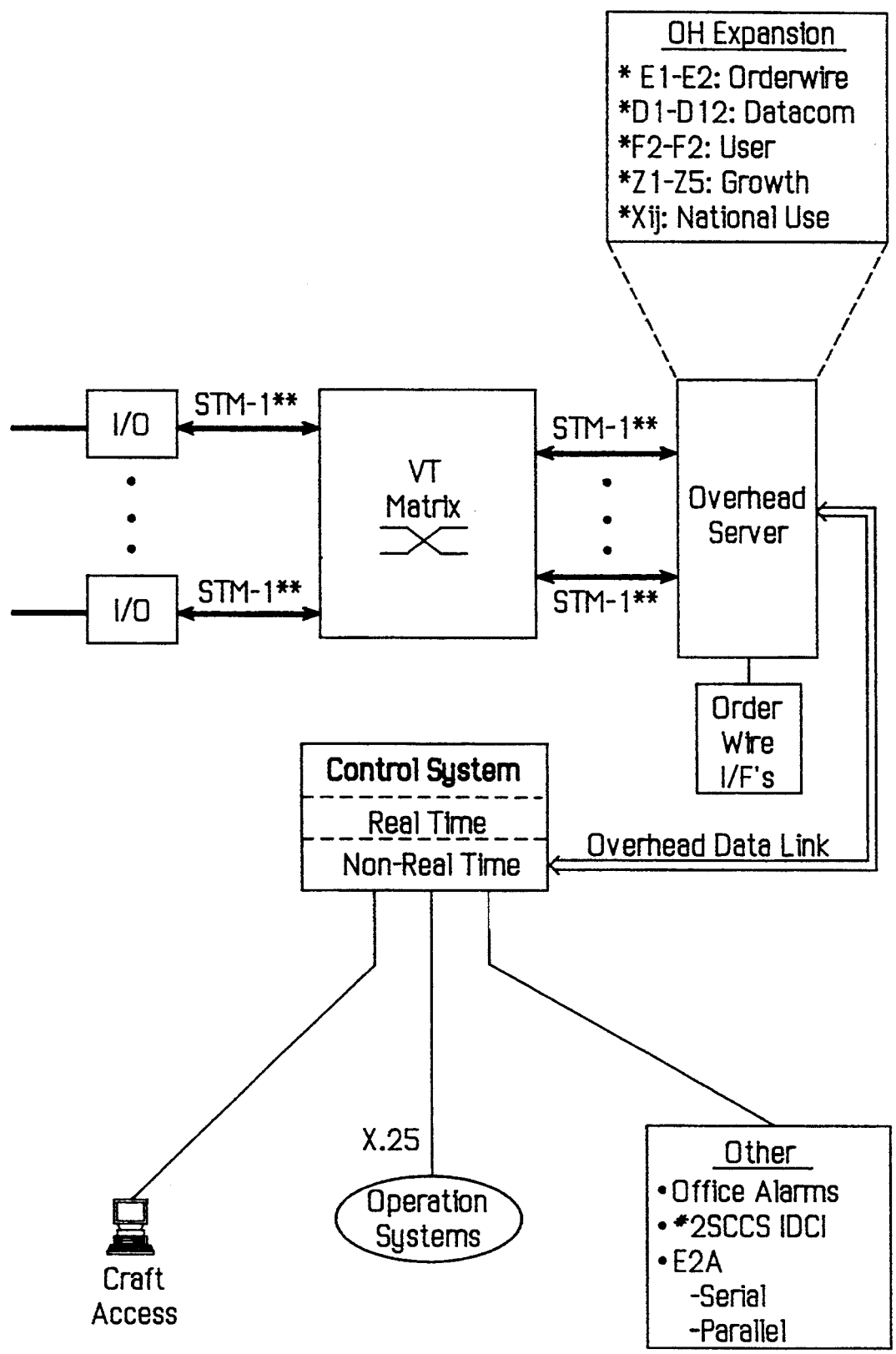
FIG. 12 shows a single server with more than one STM-1** interface.

A third configuration is a single server, as shown in FIG. 12, with multiple STM-1** interfaces. In this configuration, all the sub-networking that is necessary is contained in the architecture of the server. The configuration of FIG. 11 could be viewed as internal structures of this single server.

Figure 13:
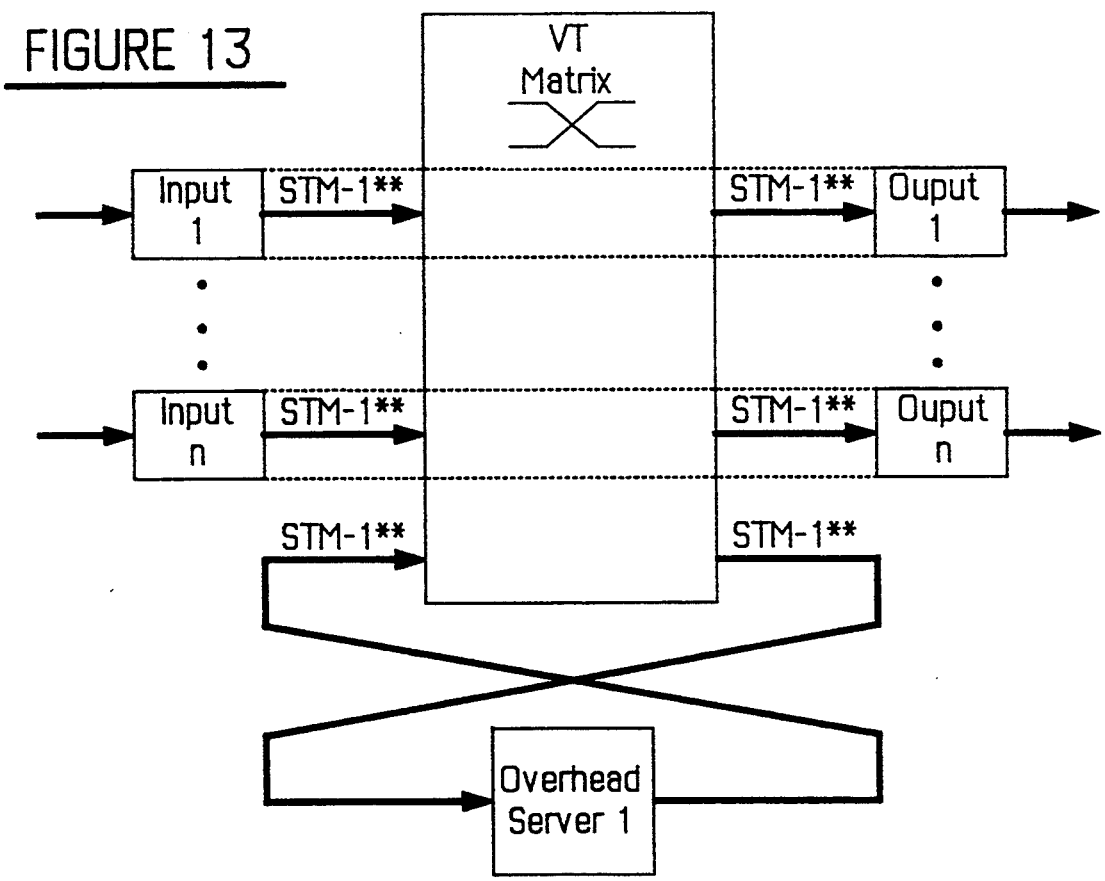
FIGS. 13–15 show handling of the overhead in the one server of FIG. 10 or over one of the STM-1** lines interfacing with the one server of FIG. 12.
Figure 14:
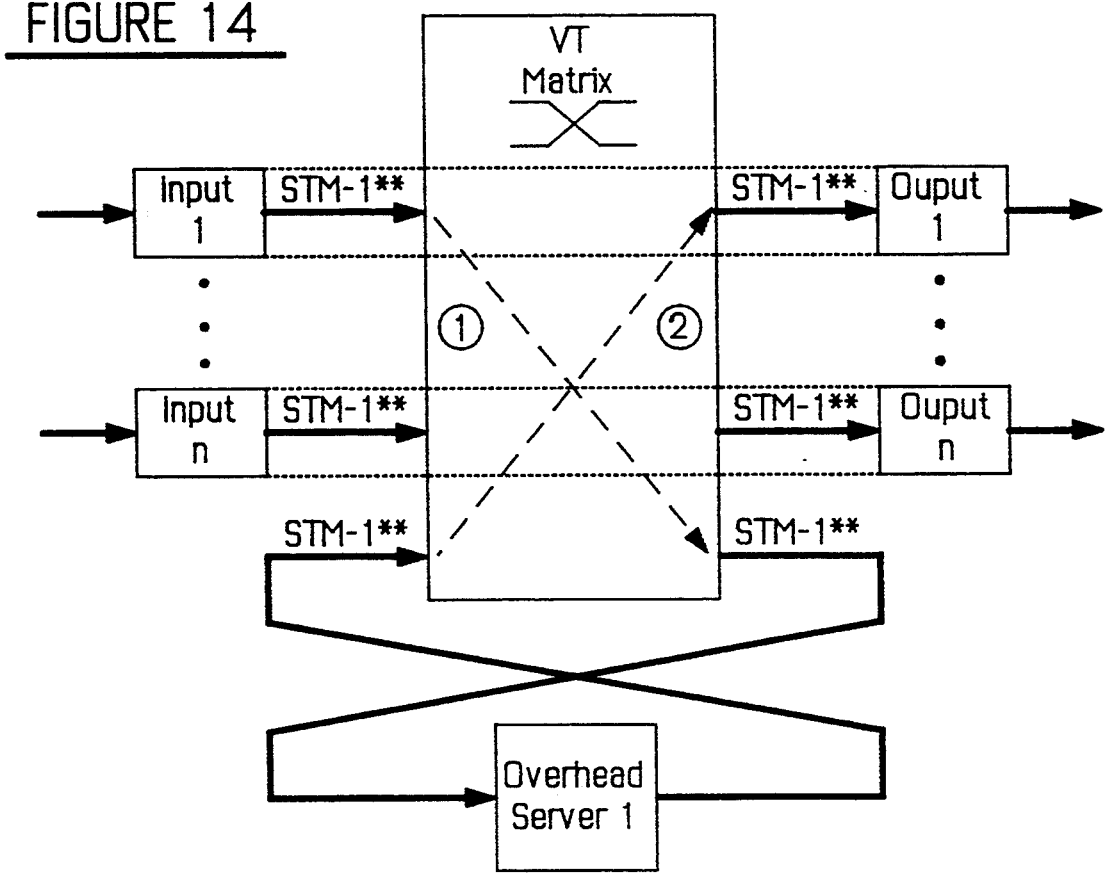
Figure 15:
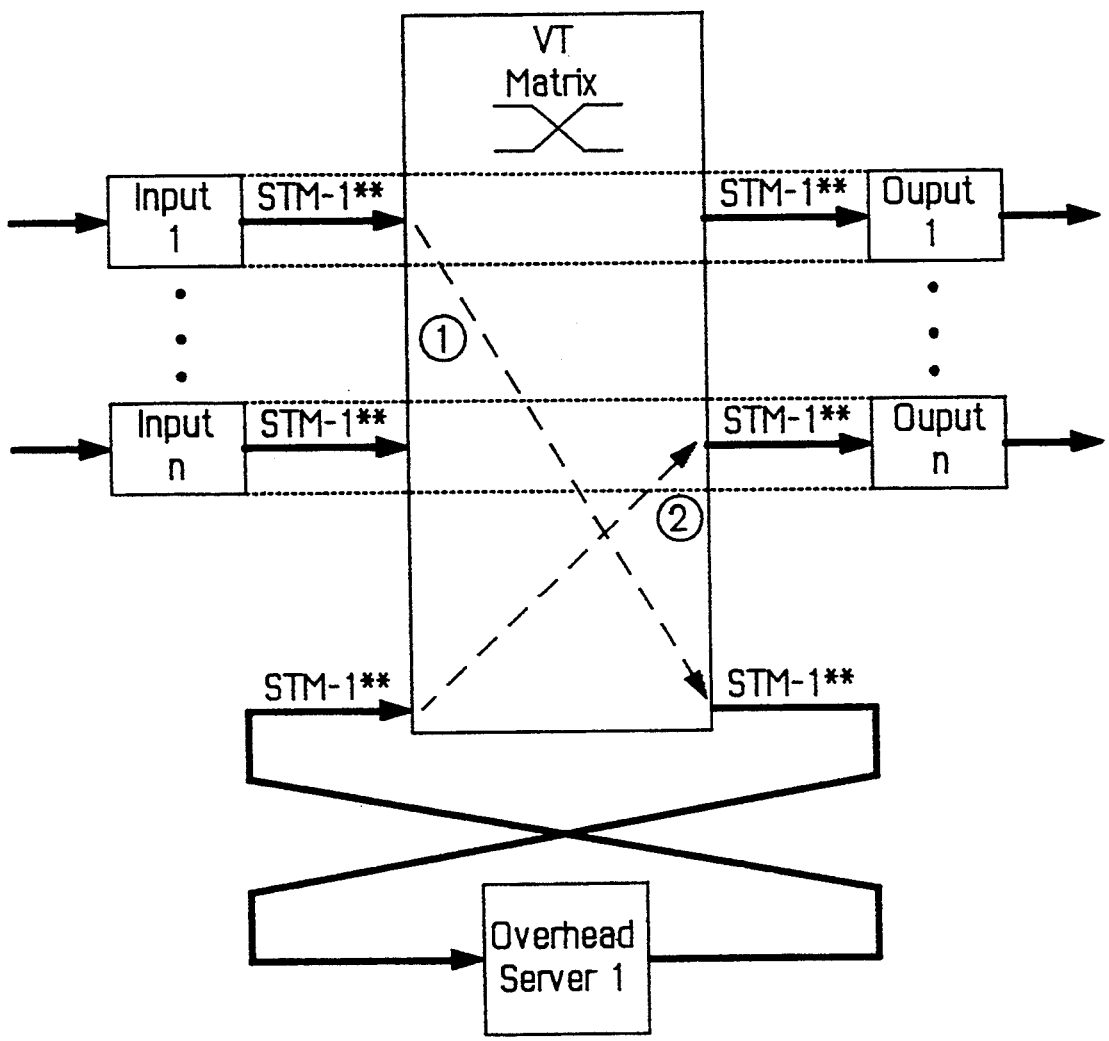

An example of a single server/single STM-1**, as shown in FIG. 10, is again shown in FIG. 13, with the networking for the overhead all handled in the one server and routed to any of the I/O ports. The illustration shows the straight-through transport of overhead through the matrix. FIG. 14 represents the situation of FIG. 10 showing terminating overhead from the input I/O No. 1 to the server No. 1 (the only server) (1) and from the server No. 1 to the output I/O No. 1 (2). FIG. 15 shows the structure of FIG. 10 in a mode terminating overhead from the input I/O No. 1 to the server No. 1 (1), and from the server No. 1 to the output I/O No. n (2).

In all of the situations shown in FIGS. 10, 13-15, there are no networking difficulties, since all the I/Os are assigned to a single STM-1 at the single server interface. The advantage of this arrangement is that all overhead is concentrated onto a single STM-1 and all overhead functions are contained in one overhead server. The disadvantage is that overhead capacity and functions are too limited.

Now, the situation of plural servers will be discussed in detail with respect to several methods of interconnection, including star, mesh and ring connections.

Figure 16:
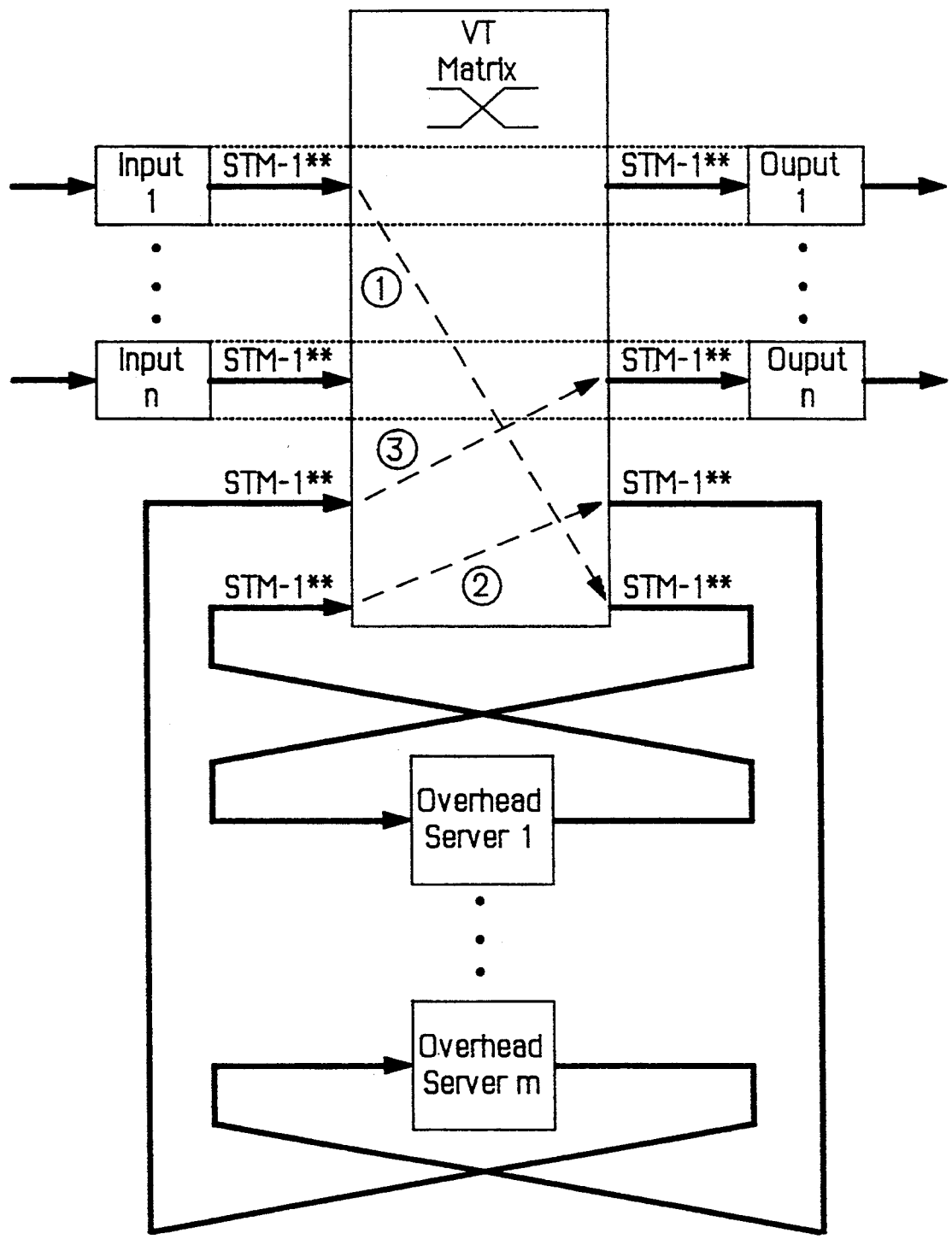
FIGS. 16 and 17 show handling of overhead in plural servers interconnected in a star network, where the center of the star is the VT matrix.
Figure 17:
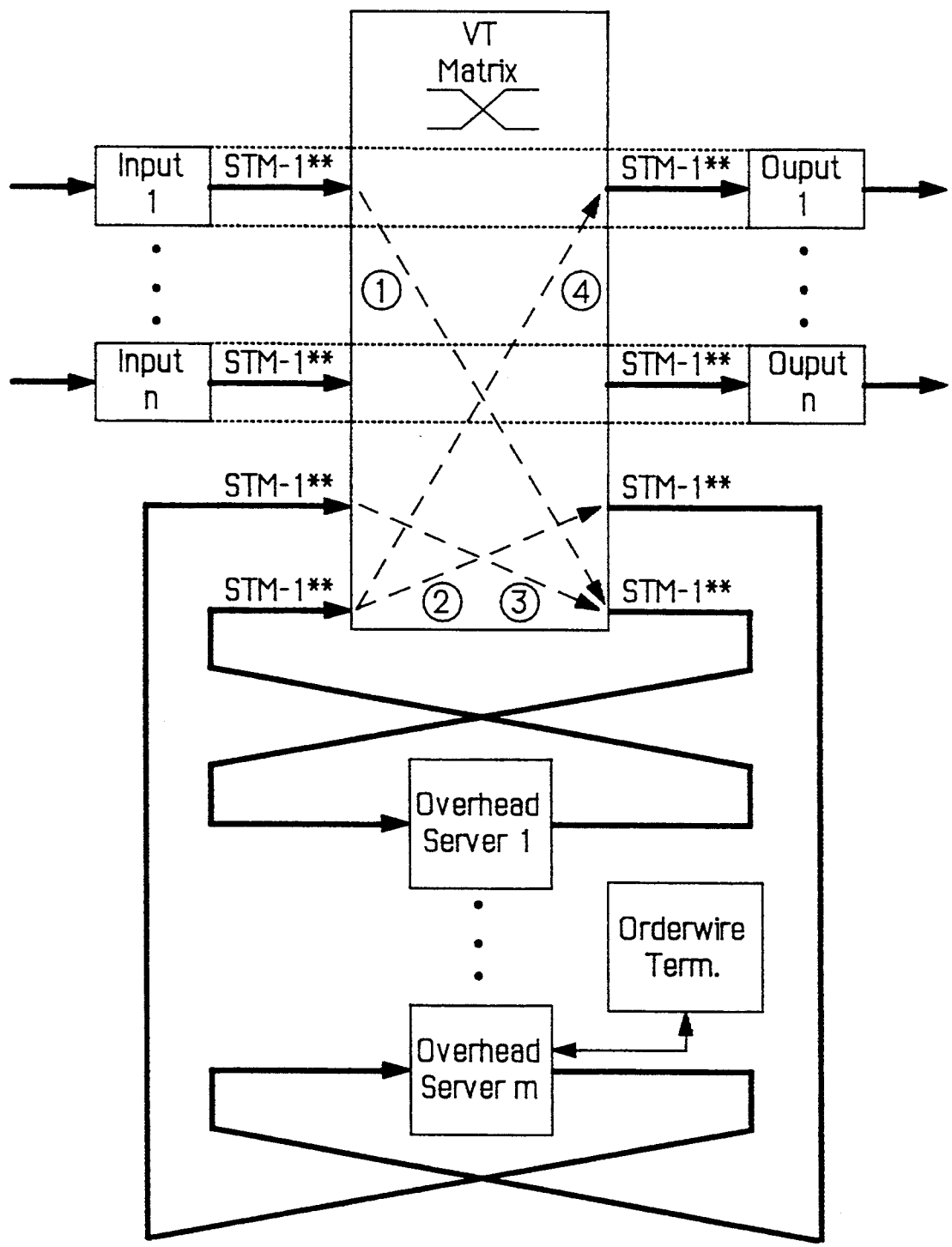

A star network is shown in FIGS. 16 and 17, where the center of the star is the VT matrix. m overhead servers are represented, each with their own STM-1** interfaces. I/Os are assigned to particular overhead servers. For the simple case of input No. 1 to output No. 1, the transport of overhead is the same as for a single server.

As shown in detail in FIG. 16, the overhead on input No. 1 may be required to be transported to the output No. n, where the I/O No. n is allocated to the overhead server m. This could be the transmission of a data communications packet. The transport scenario, represented in FIG. 16, is that the overhead is transported from input No. 1 to overhead server No. 1 (1), from overhead server No. 1 to overhead server No. m (2), and from overhead server No. m to output No. n (3).

FIG. 17 represents the situation where a particular function may be dedicated to a specific server, such as the orderwire terminations. In this case, additional transports through the VT matrix would be required. The overhead is transported from input No. 1 to overhead server No. 1, (1), from overhead server No. 1 to overhead server No. m (2), where it is terminated to the orderwire termination. For the output side, the orderwire is transported from overhead server No. m to overhead server No. 1 (3), and from the overhead server No. 1 to the output No. 1 (4).

The advantage of the star network interconnection of FIGS. 16 and 17 is that the inter-server links are all contained within the VT matrix. No additional physical links are required. The unused bandwidth of the overhead STM-1** interface could be used for the intra-links. There is no dependency on determining the number of external links as a function of cross-connect size and overhead usage. Growth in size and functions is modular and flexible. The structure provides flexible link rearrangements through electronic memory mapping and, last but not least, it is the most cost-effective for multiple servers. The main disadvantage is that multiple passes through the VT matrix are required for various connections.

Figure 18:
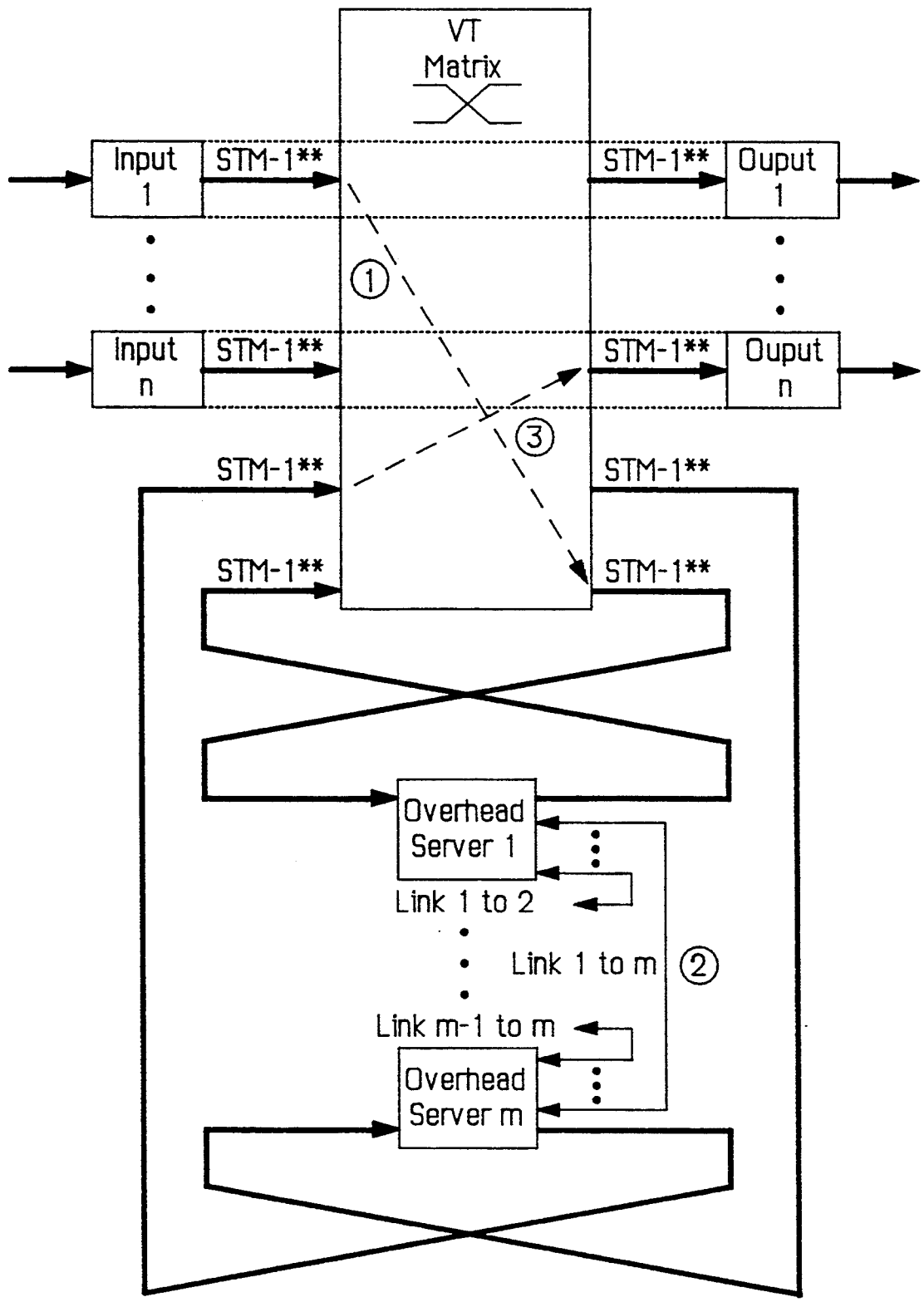
FIGS. 18–19 show handling of overhead in a plurality of servers interconnected in a mesh network, where each of the overhead servers is connected to all of the other overhead servers, and each of the overhead servers has its own STM-1** interface.
Figure 19:
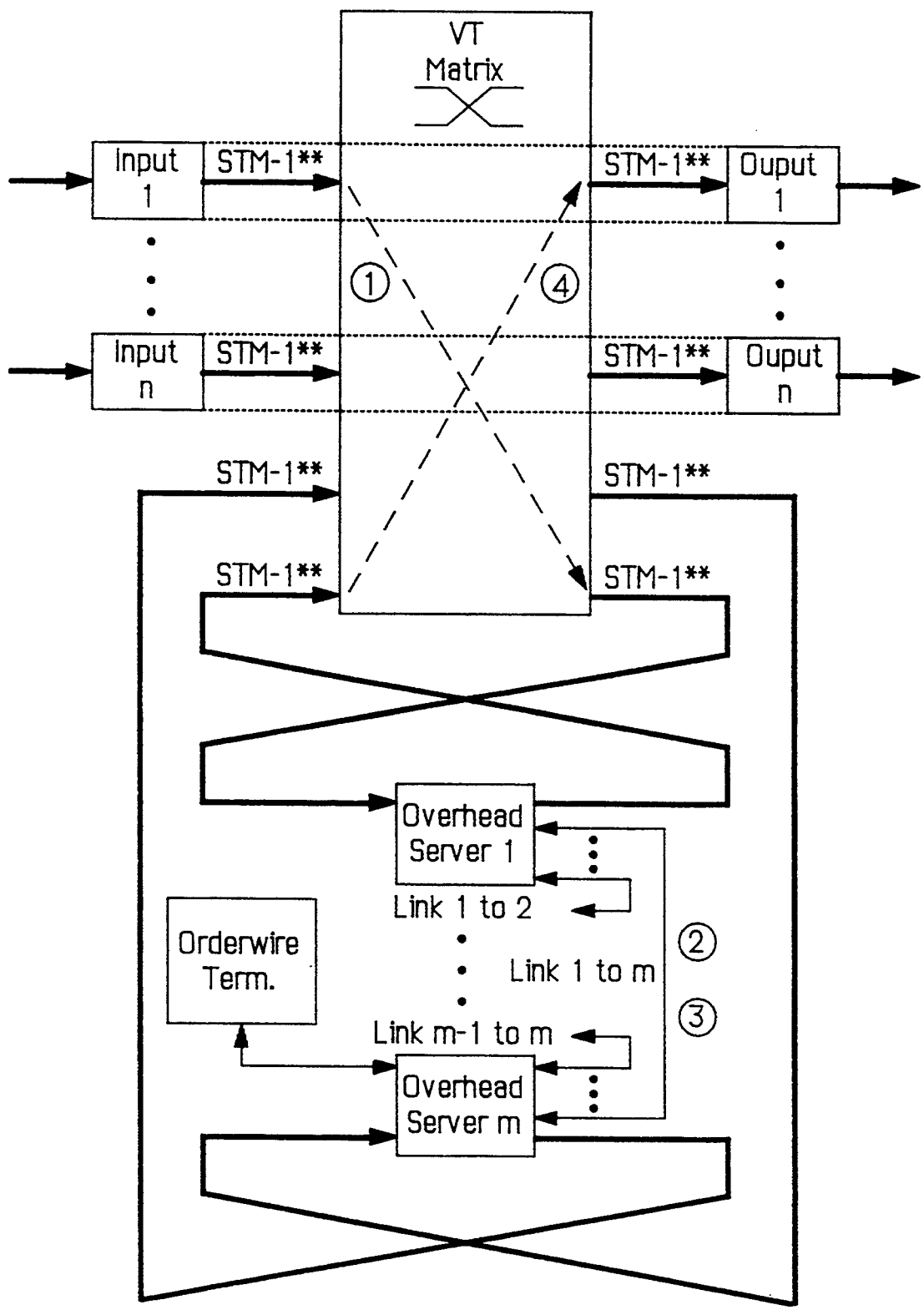

A mesh network will next be considered in connection with FIGS. 18 and 19, where each of the overhead servers is connected to all of the other overhead servers (m links) and each of the overhead servers has its own STM-1** interface. I/Os are assigned to particular overhead servers. For the simple case of input No. 1 to output No. 1, the transport of overhead is the same as for a single server.

As shown in FIG. 18, the overhead on input No. 1 may be required to be transported to the output No. n, where the I/O No. n is allocated to the overhead server m. This could be the transmission of a data communications packet. The transport scenario, represented in FIG. 18, is that the overhead is transported from input No. 1 to overhead server No. 1 (1), from overhead server No. 1 to overhead server No. m by way of an inter-server link (2), and from overhead server No. m to output No. n (3).

FIG. 19 represents a situation where a particular function may be dedicated to a specific server, such as the orderwire terminations. The overhead is transported from input No. 1 to overhead server No. 1 (1), from overhead server No. 1 to overhead server No. m by way of an inter-server link (2), where it is terminated to the orderwire termination. For the output side, the orderwire is transported from overhead server No. m by way of an inter-server link to overhead server No. 1 (3), and from the overhead server No. 1 to the output No. 1 (4).

There are various advantages to the mesh network approach of FIGS. 18 and 19. Such include growth possibilities in size and functions, since the server arrangement of interconnection is modular and flexible. The interconnection structure keeps the intra-server linkage separate from the VT matrix. There is minimum delay from server to server, and it should provide the best performance network for multiple servers. The disadvantages are that is requires the maximum number of physical links between servers, and there is a dependency on determining the number of server-to-server links as a function of cross-connect size and overhead usage.

Figure 20:
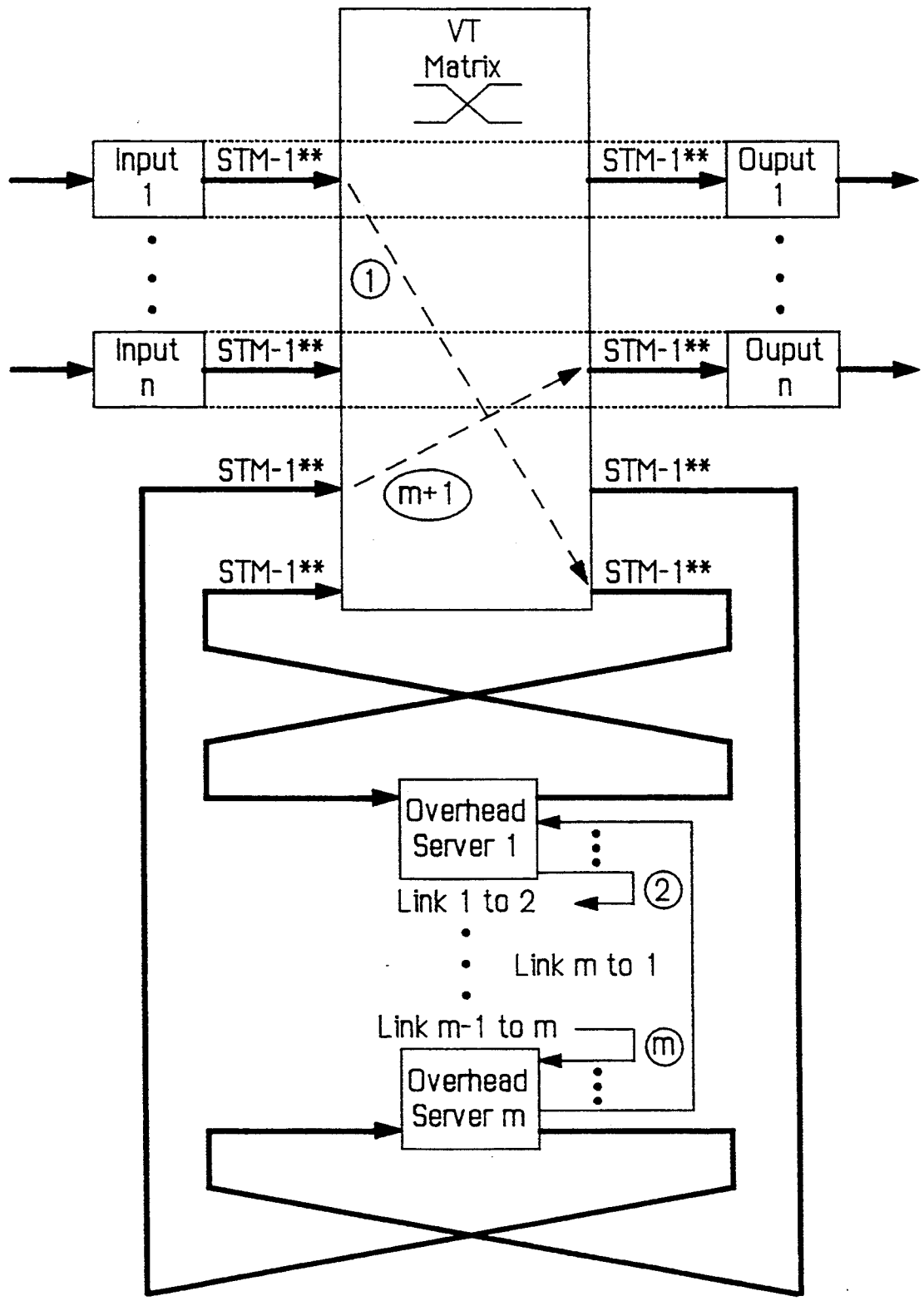
FIGS. 20 and 21 show handling of overhead in a plurality of servers interconnected in a ring network, where the overhead servers are connected to each other, and each of the overhead servers has its own STM-1** interfaces.
Figure 21:
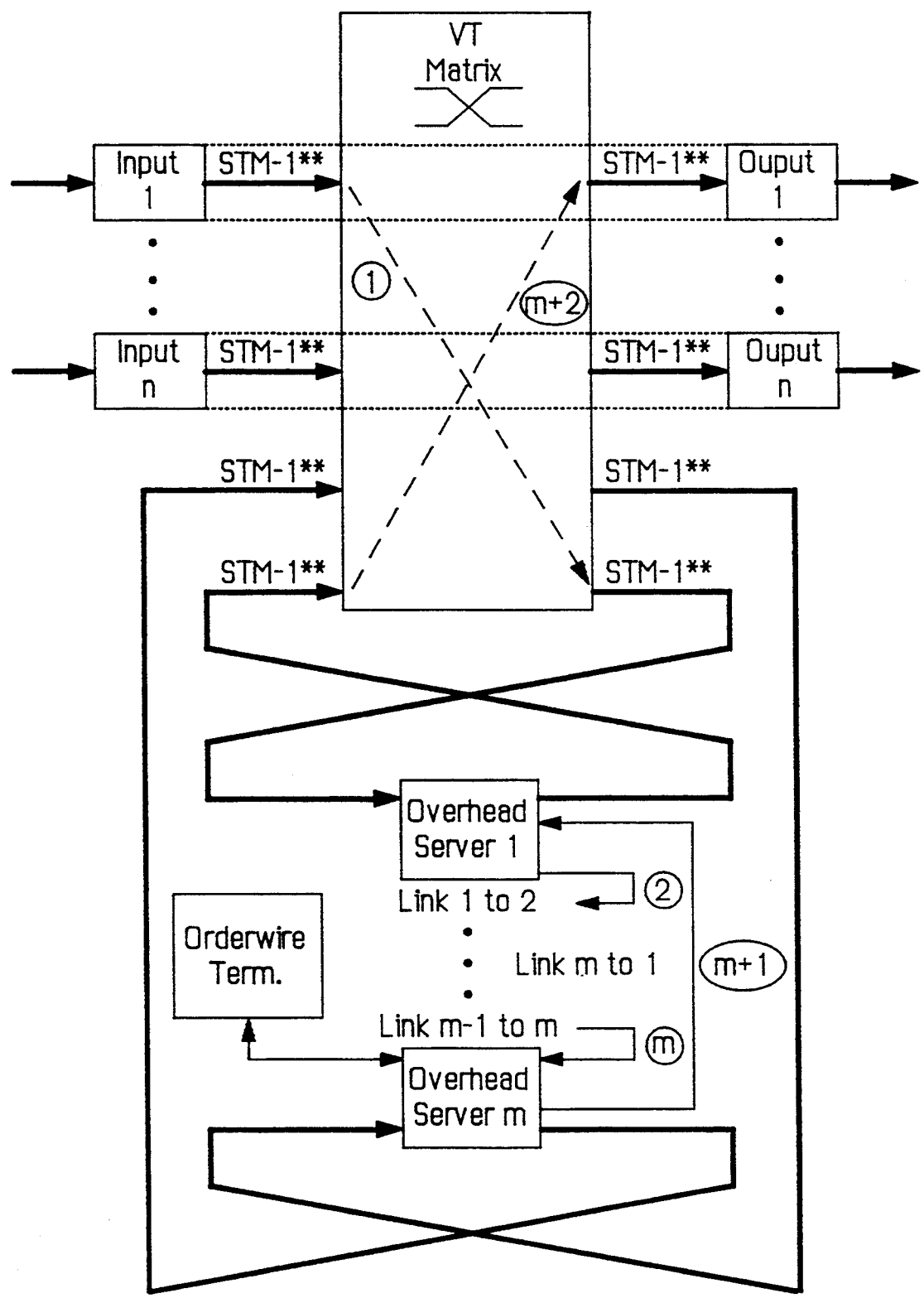

A ring network is shown in FIGS. 20 and 21, where the overhead servers are connected to each other in a ring network of No. 1 to No. 2, ... No. (m−1 to No. m, No. m to No. 1), and each of the overhead servers has its own STM-1** interface. I/Os are assigned to particular overhead servers. For the simple case of input No. 1 to output No. 1, the transport of overhead is the same as for a single server.

The overhead on input No. 1 may be required to be transport to the output No. n, where the I/O No. n is allocated to the overhead server m. This could be the transmission of a data communications packet. The transport scenario, represented in FIG. 20, is that the overhead is transported from input No. 1 to overhead server No. 1 (1), from overhead server No. 1 to overhead server No. 2 by way of an inter-server link (2), from overhead server No. 2 to overhead server No. 3 by way of an inter-server link (3), ..., from an overhead server No. (m−1) to overhead server No. m by way of an inter-server link (m), and from overhead server No. m to output No. n (m+1).

FIG. 21 represents where a particular function may be dedicated to a specific server, such as the orderwire terminations. The overhead is transported from input No. 1 to overhead server No. 1 (1), from overhead server No. 1 to overhead server No. 2 by way of an inter-server link (2), from overhead server No. 2 to overhead server No. 3 by way of an inter-server link (3), ..., from overhead server No. (m−1) to overhead server No. m by way of an inter-server link (m), where it is terminated to the orderwire termination. For the output side, the orderwire is transported from overhead server No. m by way of an inter-server link to overhead server No. 1 (m+1), and from the overhead server No. 1 to the output No. 1 (m+2).

The advantages to this approach are various. It allows growth in size and functions by way of modularity. It keeps the intra-server linkage separate from the VT matrix. It requires fewer server-to-server links than the mesh network. The disadvantages are dependency on determining the number of external links as a function of cross-connect size and overhead usage. Multiple passes through the servers for various connections add delays. Finally, it is more complicated in the service upgrade context.

It should be realized that the single server with multiple STM-1s of FIG. 12 is identical to the single server/single STM-1, except that all the STM-1**s interface to a single server. All of the sub-networkings therefore are contained within the server. The advantages are that there are no server-to-server links, and all overhead functions are contained in one overhead server. The disadvantage is that the architecture and implementation must accommodate from the minimum to maximum size required. This results in higher cost at the low end of cross-connect overhead usage.

Although the invention has been shown and described with reference to a best mode embodiment thereof, various approaches, modifications and changes may be made according to the teachings hereof without departing from the spirit and scope of the invention as claimed below.

What is claimed is:

1. A network element, comprising:
   a cross-connect, responsive to a plurality of input signals in an electrical transport format for use in the network element, the input signals comprising both overhead and data signals organized in frames having a plurality of rows and columns of bytes, for cross-connecting the input data and overhead signals and for providing the cross-connected input data and overhead signals in the electrical transport format; and
   plural servers, each responsive to different cross-connected input data and overhead signals from the cross-connect in the electrical transport format, for selectively input data and overhead signals and responsive to output data and overhead signals from user interfaces, for providing the output data and overhead signals in the electrical transport format, and wherein the cross-connect is responsive to the output data and overhead signals in the electrical transport format for cross-connecting and providing same as cross-connected output signals in the electrical transport format.

2. The network element of claim 1, wherein the plural servers are interconnected in a star network.

3. The network element of claim 1, wherein the plural servers are interconnected in a mesh network.

4. The network element of claim 1, wherein the plural servers are interconnected in a ring network.

5. A network element, comprising:
   a cross-connect, responsive to a plurality of input signals in an electrical transport format for use in the network element having both overhead and data signals organized in frames having a plurality of rows and columns of bytes, for cross-connecting the input data and overhead signals and for providing the input data and overhead signals in the electrical transport format; and
   plural servers, interconnected in a star network, each responsive to different input data and overhead signals in the electrical transport format from the cross-connect on a plurality of corresponding interfaces, each having the electrical transport format, for selectively terminating input data and overhead signals and responsive to output data and overhead signals from user interfaces, for providing the output data and overhead signals in the electrical transport format, and wherein the cross-connect is responsive to the output data and overhead signals in the electrical transport format for cross-connecting and providing same as cross-connected output signals in the electrical transport format.

6. A network element, comprising:
   a cross-connect, responsive to a plurality of input signals in an electrical transport format for use the network element having both overhead and data signals organized in frames having a plurality of rows and columns of bytes, for cross-connecting the input data and overhead signals and for providing the input data and overhead signals in the electrical transport format; and plural servers, interconnected in a mesh network, each responsive to different input data and overhead signals in the electrical transport format from the cross-connect on a plurality of corresponding interfaces, each having the electrical transport format, for selectively terminating input data and overhead signals and responsive to output data and overhead signals from user interfaces, for providing the output data and overhead signals in the electrical transport format, and wherein the cross-connect is responsive to the output data and overhead signals in the electrical transport format for cross-connecting and providing same as cross-connected output signals in the electrical transport format.

7. A network element, comprising:

a cross-connect, responsive to a plurality of input signals in an electrical transport format for use in the network element having both overhead and data signals organized in frames having a plurality of rows and columns of bytes, for cross-connecting the input data and overhead signals and for providing the input data and overhead signals in the electrical transport format; and plural servers, interconnected in a ring network, each responsive to different input data and overhead signals in the electrical transport format from the cross-connect on a plurality of corresponding interfaces, each having the electrical transport format, for selectively terminating input data and overhead signals and responsive to output data and overhead signals from user interfaces, for providing the output data and overhead signals in the electrical transport format, and wherein the cross-connect is responsive to the output data and overhead signals in the electrical transport format for cross-connecting and providing same as cross-connected output signals in the electrical transport format.

* * * * *

UNITED STATES PATENT AND TRADEMARK OFFICE
CERTIFICATE OF CORRECTION

PATENT NO. : 5,365,518
DATED : November 15, 1994
INVENTOR(S) : F. Noser

It is certified that error appears in the above-indentified patent and that said Letters Patent is hereby corrected as shown below:

Col. 16, claim 1, line 14, after "selectively", insert --terminating--.

Col. 16, claim 6, line 3, after "use", insert --in--.

Signed and Sealed this

Thirty-first Day of January, 1995

Attest:

BRUCE LEHMAN

Attesting Officer

Commissioner of Patents and Trademarks